United States Patent
Muslea et al.

(10) Patent No.: US 6,606,625 B1
(45) Date of Patent: Aug. 12, 2003

(54) WRAPPER INDUCTION BY HIERARCHICAL DATA ANALYSIS

(75) Inventors: Ion Muslea, Culver City, CA (US); Steven Minton, El Segundo, CA (US); Craig A. Knoblock, El Segundo, CA (US)

(73) Assignee: University of Southern California, Los Angeles, CA (US)

( * ) Notice: Subject to any disclaimer, the term of this patent is extended or adjusted under 35 U.S.C. 154(b) by 155 days.

(21) Appl. No.: 09/587,528

(22) Filed: Jun. 2, 2000

Related U.S. Application Data

(60) Provisional application No. 60/137,783, filed on Jun. 3, 1999.

(51) Int. Cl.[7] .............................................. G06F 17/30
(52) U.S. Cl. .............................................. 707/6; 707/10
(58) Field of Search ................................ 709/310, 100; 707/10, 1, 6

(56) References Cited

U.S. PATENT DOCUMENTS

| | | | |
|---|---|---|---|
| 5,765,150 A | 6/1998 | Burrows .......................... | 707/5 |
| 5,819,258 A | 10/1998 | Vaithyanathan et al. ........ | 707/2 |
| 5,864,848 A | 1/1999 | Horvitz et al. ................. | 707/6 |
| 5,864,863 A | 1/1999 | Burrows ...................... | 707/103 |
| 5,870,608 A | 2/1999 | Gregory ...................... | 717/131 |
| 5,895,470 A | 4/1999 | Pirolli et al. ................. | 707/102 |
| 5,913,214 A | 6/1999 | Madnick et al. .............. | 707/10 |
| 5,915,251 A | 6/1999 | Burrows et al. ............. | 707/102 |
| 5,983,267 A | 11/1999 | Shklar et al. ................. | 707/10 |
| 5,991,756 A | 11/1999 | Wu ............................... | 707/3 |
| 6,023,726 A | 2/2000 | Saksena ....................... | 709/219 |
| 6,029,195 A | 2/2000 | Herz ............................ | 707/10 |
| 6,102,969 A * | 8/2000 | Christianson et al. ......... | 707/10 |
| 6,304,870 B1 * | 10/2001 | Kushmerick et al. ......... | 707/10 |

OTHER PUBLICATIONS

C. Hsu and M. Dung. Generating finite–state transducers for semi–structured data extraction from the web. Journal of Information Systems, 23(8):521–538, 1998.*

I. Muslea, S. Minton, and C. Knoblock, Stalker: Learning extraction rules for semistructured, web–based information sources', in AAAI Workshopon AI and Information Intergration, (1998).*

Muslea, Ion et al., "Hierarchical Wrapper Induction for Semistructured Information Sources," Kluwer Academic Publishers, Netherlands, 1999, pp. 1–27.

(List continued on next page.)

*Primary Examiner*—Diane D. Mizrahi
*Assistant Examiner*—Yicun Wu
(74) *Attorney, Agent, or Firm*—Cislo & Thomas LLP

(57) ABSTRACT

An inductive algorithm, denominated STALKER, generating high accuracy extraction rules based on user-labeled training examples. With the tremendous amount of information that becomes available on the Web on a daily basis, the ability to quickly develop information agents has become a crucial problem. A vital component of any Web-based information agent is a set of wrappers that can extract the relevant data from semistructured information sources. The novel approach to wrapped induction provided herein is based on the idea of hierarchical information extraction, which turns the hard problem of extracting data from an arbitrarily complex document into a series of easier extraction tasks. Labeling the training data represents the major bottleneck in using wrapper induction techniques, and experimental results show that STALKER performs significantly better than other approaches; on one hand, STALKER requires up to two orders of magnitude fewer examples than other algorithms, while on the other hand it can handle information sources that could not be wrapped by prior techniques. STALKER uses an embedded catalog formalism to parse the information source and render a predictable structure from which information may be extracted or by which such information extraction may be facilitated and made easier.

13 Claims, 18 Drawing Sheets

OTHER PUBLICATIONS

Muslea, Ion et al., "A Hierarchical Approach to Wrapper Induction," University of Southern California, Integrated Media Systems Center, 8 pages.

Muslea, Ion et al., "Wrapper Induction for Semistructured, Web–based Information Sources," Information Sciences Institute, the Integrated Media Systems Center, and Computer Science Department, University of Southern California, 6 pages.

Chidlovskii, Boris et al., "Towards Sophisticated Wrapping of Web–based Information Repositories," In: Proc. $5^{th}$ Int'l RIAO Conf., Montreal, Canada, Jun. 25–27, 1997, pp. 123–135.

Hsu, Chun–Nan, "Initial Results on Wrapping Semistructured Web Pages with Finite–State Transducers and Contextual Rules," Department of Computer Science and Engineering, Arizona State University, Tempe, Arizona, 8 pages.

Freitag, Dayne, "Information Extraction from HTML: Application of a General machine Learning Approach," Department of Computer Science, Carnegie Mellon University, Pittsburgh, Pennsylvania, 7 pages.

Califf, Mary et al., "Relational Learning of Pattern–Match Rules for Information Extraction," Department of Computer Sciences, University of Texas, Austin, Texas, 7 pages.

Raychaudhuri, Tirthankar et al., "Active Learning—Approaches and Issues," pp. 205–241.

Atzeni, Paolo et al., "To Weave the Web," DIFA University of Rome, Italy, pp. 2–20.

Mecca, Giansalvatore et al., "Cut and Paste," DIFA University della Basilicata, Potenza, Italy, pp. 1–25 and I–IV.

Chawathe, Sudarshan et al., "The TSIMMIS Project: Integration of Heterogeneous Information Sources," Department of Computer Science, Stanford University, pp. 1–12.

Cohen, William, "A Web–based Information System that Reasons with Structured Collections of Text," 8 pages.

Soderland, Stephen, "Learning Information Extraction Rules for Semi–structured and Free Text," Department Computer Science & Engineering, University of Washington, Seattle, Washington, pp. 1–44.

Ashish, Naveen, "Semi–automatic Wrapper Generation for Internet Information Sources," Information Sciences Institute and Department of Computer Science, University of Southern California, 10 pages.

Knoblock, Craig et al., "Modeling Web Sources for Information Integration," Information Sciences Institute, Integrated Media Systems Center, University of Southern California, 8 pages.

Kirk, Thomas et al., "The Information Manifold," AT&T Bell Laboratories, 8 pages.

Kushmerick, Nicholas, "Wrapper Induction for Information Extraction," University of Washington, 1997, 259 pages.

* cited by examiner

FIG. 1

Figure 3: A simplified version of a Zagat document.

E1: 513 Pico, <b>Venice</b>, Phone: 1-<b> 800 </b>-555-1515
E2: 90 Colfax, <b> Palms </b>, Phone: ( 818 ) 508-1570
E3: 523 1st St., <b> LA </b>, Phone: 1-<b> 888 </b>-578-2293
E4: 403 Vernon, <b> Watts </b>, Phone: ( 310 ) 798-0008
Figure 4: Four examples of restaurant addresses.

FIGURE 4

STALKER( Examples )
- let RetVal be an empty SLG
  - WHILE Examples ≠ ∅
    - aDisjunct = LearnDisjunct(Examples)
    - remove all examples covered by aDisjunct
    - add aDisjunct to RetVal
- return RetVal

LearnDisjunct( Examples )
- Terminals = Wildcards ∪ GetTokens(Examples)
- Candidates = GetInitialCandidates(Examples)
- WHILE Candidates ≠ ∅ DO
  - let D = BestDisjunct(Candidates)
  - IF D is a perfect disjunct THEN return D
  - FOR EACH t ∈ Terminals DO
    Candidates = Candidates ∪ Refine(D,t)
  - remove D from Candidates
- return best disjunct Figure 6: The stalker algorithm.

FIGURE 6

Figure 8: Initial candidates (first iteration)

| SRC | Name | Nmb. of Leaves | Nmb. Docs | Available Examples |
|---|---|---|---|---|
| S1 | OKRA | 4 | 252 | 3335 |
| S2 | BigBook | 6 | 235 | 4299 |
| S3 | Address Finder | 6 | 10 | 57 |
| S4 | Quote Server | 18 | 10 | 22 |

Table 1: Illustrative information sources.

FIGURE 9

| SR | Missing Items | Various Orders | WIEN | | STALKER | |
|---|---|---|---|---|---|---|
| | | | Exs | CPU | Exs | CPU |
| S1 | - | - | 46 | 5 sec. | 1 | 19 sec. |
| S2 | - | - | 274 | 83 sec. | 8 | 7 sec. |
| S3 | yes | yes | - | - | 10 | 202 sec. |
| S4 | yes | - | - | - | 10 | 708 sec. |

Table 2: Experimental Data

FIGURE 10

| SRC | Extraction Task | Correctness | Nmb. Examples |
|---|---|---|---|
| S1 | Score | 100% | 1 |
| | Email | 100% | 1 |
| | Name | 100% | 1 |
| | First Entered | 100% | 1 |
| | List Extraction | 98.89% | 10 |
| | List Iteration | 100% | 1 |
| S2 | Name | 100% | 3 |
| | Address | 100% | 3 |
| | City | 100% | 4 |
| | State | 99.63% | 10 |
| | Area Code | 98.38% | 10 |
| | Phone | 98.38% | 10 |
| | List Extraction | 96.63% | 10 |
| | List Iteration | 100% | 3 |

Table 3: Correctness levels for $S_1$ and $S_2$

FIGURE 11

(b) List extraction and list iteration tasks.

(a) The median and lowest accuracy tasks for S3 and S4.

FIGURE 13

LearnRule( *Examples* )
- let *RetVal* be an empty rule
- WHILE *Examples* $\neq \emptyset$
  - *aDisjunct* =LearnDisjunct(*Examples*)
  - remove all examples covered by *aDisjunct*
  - add *aDisjunct* to *RetVal*
- return OrderDisjuncts(*RetVal*)

LearnDisjunct( *Examples* )
- let *Seed* $\in$ *Examples* be the shortest example
- *Candidates* = GetInitialCandidates( *Seed* )
- DO
  - *BestRefiner* = GetBestRefiner( *Candidates* )
  - *BestSolution* = GetBestSolution( *Candidates* $\cup$ {*BestSolution*} )
  - *Candidates* = Refine(*BestRefiner*, *Seed*)
  WHILE IsNotPerfect(*BestSolution*) AND *BestRefiner* $\neq \emptyset$
- return PostProcess(*BestSolution*)

Refine( *C, Seed* )
- let $C$ consist on the consecutive landmarks $l_1, l_2, \cdots, l_n$
- let *TopologyRefs* = *LandmarkRefs* = $\emptyset$
- FOR $i = 1$ TO $n$ DO
  - let $m$ be the number of tokens in $l_i$

- FOR EACH token $t$ in *Seed* DO
    - in a copy $Q$ of $C$, add the 1-token landmark $t$ between $l_i$ and $l_{i+1}$
    - create one such rule for each wildcard that matches $t$
    - add all these new rules to *TopologyRefs*

- FOR EACH sequence $s = \overline{t_0 t_1 \cdots t_{m+1}}$ in *Seed* DO
    - IF Matches($l_i$, $s$) THEN
      - let $P = Q = C$
      - in $P$, replace $l_i$ by $\overline{t_0 l_i}$
      - in $Q$, replace $l_i$ by $\overline{l_i t_{m+1}}$
      - create similar rules for each wildcard that matches $t_0$ and $t_{m+1}$
      - add both $P$ and $Q$ to *LandmarkRefs*
- return *TopologyRefs* $\cup$ *LandmarkRefs*

BestRefiner()
Prefer candidates that have:
- larger coverage
- more early matches
- more failed matches
- fewer wildcards
- shorter unconsumed prefixes
- fewer tokens in *SkipUntil*()
- longer end-landmarks

BestSolution()
Prefer candidates that have:
- more correct matches
- more failures to match
- fewer tokens in *SkipUntil*()
- fewer wildcards
- longer end-landmarks
- shorter unconsumed prefixes

FIGURE 14

R10: *SkipTo(Venice) SkipTo(<b>)*
R11: *SkipTo(</b>) SkipTo(<b>)*
R12: *SkipTo(:) SkipTo(<b>)*
R13: *SkipTo(-) SkipTo(<b>)*
R14: *SkipTo(,) SkipTo(<b>)*
R15: *SkipTo(Phone) SkipTo(<b>)*
R16: *SkipTo(1) SkipTo(<b>)*
R17: *SkipTo(Numeric) SkipTo(<b>)*
R18: *SkipTo(Punctuation)SkipTo(<b>)*
R19: *SkipTo(HtmlTag) SkipTo(<b>)*
R20: *SkipTo(AlphaNum) SkipTo(<b>)*
R21: *SkipTo(Alphabetic) SkipTo(<b>)*
R22: *SkipTo(Capitalized) SkipTo(<b>)*
R23: *SkipTo(NonHtml) SkipTo(<b>)*
R24: *SkipTo(Anything) SkipTo(<b>)*

Table I. Test domains for WIEN and STALKER: a dash denotes failure, while √ and ≃ mean *perfectly* and *imperfectly* wrapped, respectively.

| SRC | Miss | Perm | Embd | WIEN | STALKER | | |
|---|---|---|---|---|---|---|---|
| | | | | | | ListExtr | ListIter |
| S1 | - | - | - | √ | ≃ | 1/100% | 1/100% |
| S2 | yes | - | - | - | ≃ | 1/100% | 1/100% |
| S3 | - | - | - | √ | ≃ | 1/100% | 5/100% |
| S4 | - | - | - | √ | √ | 7/100% | 1/100% |
| S5 | - | - | - | √ | √ | 1/100% | 1/100% |
| S6 | yes | - | - | - | ≃ | 1/100% | 8/100% |
| S7 | yes | - | - | - | √ | 6 & 1/100% | 2 & 7/100% |
| S8 | - | - | - | √ | √ | 1/100% | 1/100% |
| S9 | yes | - | 1 | - | ≃ | 10/100% | 10/96% |
| | | | | | | 10/94% | 7/100% |
| S10 | - | - | - | √ | √ | 1/100% | 1/100% |
| S11 | yes | yes | - | - | ≃ | 1/100% | 3/100% |
| S12 | - | - | - | √ | √ | 1/100% | 1/100% |
| S13 | - | - | - | √ | √ | 1/100% | 1/100% |
| S14 | - | - | - | √ | √ | 1/100% | 1/100% |
| S15 | - | - | - | √ | √ | 1/100% | 1/100% |
| S16 | yes | - | - | - | √ | - | - |
| S17 | - | - | 1 | - | √ | 1 & 1/100% | 4 & 1/100% |
| S18 | yes | - | - | - | √ | 1 & 4/100% | 1 & 1/100% |
| S19 | - | - | - | √ | √ | 1/100% | 1/100% |
| S20 | - | - | - | √ | √ | 1/100% | 1/100% |
| S21 | yes | yes | 2 | - | - | - | - |
| S22 | - | - | - | √ | √ | 1/100% | 1/100% |
| S23 | - | - | - | √ | √ | 1/100% | 1/100% |
| S24 | yes | - | 1 | - | ≃ | 1/100% | 1/100% |
| | | | | | | 1/100% | 10/91% |
| S25 | - | - | - | √ | √ | 1/100% | 1/100% |
| S26 | - | - | 1 | - | ≃ | 1 & 1/100% | 1 & 1/100% |
| S27 | - | - | - | √ | √ | - | - |
| S28 | - | - | - | √ | √ | 1/100% | 1/100% |
| S29 | yes | yes | - | - | - | - | - |
| S30 | - | - | - | √ | √ | 1/100% | 1/100% |

Table II. Sources Wrapped Perfectly by Both Systems.

| SRC | WIEN | | STALKER (number of examples) | | | |
|---|---|---|---|---|---|---|
| | Docs | Exs | Min | Max | Mean | Median |
| S4  | 2.0 | 20.0  | 1.0 | 7.0 | 2.0 | 1.0 |
| S5  | 2.0 | 14.4  | 1.0 | 3.0 | 1.5 | 1.0 |
| S8  | 2.0 | 43.6  | 1.0 | 2.0 | 1.2 | 1.0 |
| S10 | 3.9 | 39.0  | 1.0 | 2.0 | 1.2 | 1.0 |
| S12 | 2.0 | 88.8  | 1.0 | 1.0 | 1.0 | 1.0 |
| S13 | 2.0 | 20.0  | 1.0 | 3.0 | 1.5 | 1.0 |
| S14 | 7.0 | 679.7 | 1.0 | 2.0 | 1.4 | 1.0 |
| S15 | 2.0 | 70.8  | 1.0 | 1.0 | 1.0 | 1.0 |
| S19 | 2.0 | 40.0  | 1.0 | 1.0 | 1.0 | 1.0 |
| S20 | 2.0 | 65.4  | 1.0 | 1.0 | 1.0 | 1.0 |
| S22 | 2.0 | 200.0 | 1.0 | 1.0 | 1.0 | 1.0 |
| S23 | 2.0 | 109.0 | 1.0 | 7.0 | 1.6 | 1.0 |
| S25 | 2.0 | 65.4  | 1.0 | 1.0 | 1.0 | 1.0 |
| S27 | 2.0 | 2.0   | 1.0 | 4.0 | 2.2 | 1.5 |
| S28 | 2.0 | 150.0 | 1.0 | 1.0 | 1.0 | 1.0 |
| S30 | 5.3 | 15.9  | 1.0 | 9.0 | 2.4 | 1.0 |

Table III. Source on which WIEN fails completely, while STALKER wraps them perfectly.

| SRC | WIEN | STALKER (number of examples) | | | |
|---|---|---|---|---|---|
| | | Min | Max | Mean | Median |
| S7  | - | 1.0 | 7.0  | 2.3 | 1.0 |
| S16 | - | 1.0 | 10.0 | 3.4 | 1.0 |
| S17 | - | 1.0 | 4.0  | 1.5 | 1.0 |
| S18 | - | 1.0 | 4.0  | 1.4 | 1.0 |

FIGURE 19

Table IV. Sources on which WIEN outperforms STALKER.

| SRC | WIEN | | STALKER | | |
|---|---|---|---|---|---|
| | Docs | Exs | Task | Accuracy | Exs |
| S1 | 2.0 | 80.6 | Price | 100% | 1 |
| | | | URL | 91% | 10 |
| | | | Product | 92% | 10 |
| | | | Manufacturer | 100% | 3 |
| | | | List Extraction | 100% | 1 |
| | | | List Iteration | 100% | 1 |
| S3 | 2.0 | 34.8 | URL | 100% | 8 |
| | | | Title | 100% | 1 |
| | | | Abstract | 100% | 1 |
| | | | Size | 100% | 1 |
| | | | Date | 98% | 10 |
| | | | Time | 97% | 10 |
| | | | List Extraction | 100% | 1 |
| | | | List Iteration | 100% | 5 |

Table V. Sources on which WIEN fails, and STALKER wraps imperfectly.

| SRC | Task | Accur. | Exs | SRC | Task | Accur. | Exs |
|---|---|---|---|---|---|---|---|
| S2 | URL | 100% | 1 | S6 | Faculty | 100% | 4 |
|  | Source | 99% | 10 |  | University | 93% | 10 |
|  | Title | 88% | 10 |  | Attention | 100% | 2 |
|  | Date | 84% | 10 |  | Address | 100% | 2 |
|  | ListExtr | 100% | 1 |  | City | 100% | 1 |
|  | ListIter | 100% | 1 |  | ZIP | 100% | 1 |
| S9 | Date | 100% | 1 |  | Province | 100% | 1 |
|  | Price | 100% | 1 |  | Country | 100% | 1 |
|  | Airline | 100% | 1 |  | Phone | 100% | 1 |
|  | Flight | 100% | 1 |  | Fax | 96% | 10 |
|  | DepartCity | 100% | 1 |  | URL | 97% | 10 |
|  | DepartCode | 100% | 1 |  | UpdateOn | 100% | 1 |
|  | ArriveCity | 99% | 10 |  | UpdateBy | 100% | 1 |
|  | ArriveCode | 100% | 2 |  | ListExtr | 100% | 1 |
|  | DepartTime | 100% | 3 |  | ListIter | 100% | 8 |
|  | ArriveTime | 92% | 10 | S11 | Name | 94% | 10 |
|  | Availab. | 95% | 10 |  | Email | 98% | 10 |
|  | Food | 100% | 6 |  | Update | 66% | 10 |
|  | Plane | 100% | 3 |  | Organiz. | 48% | 10 |
|  | ListExtr-1 | 100% | 10 |  | Alt. Name | 100% | 1 |
|  | ListIter-1 | 94% | 10 |  | Provider | 100% | 1 |
|  | ListExtr-2 | 96% | 10 |  | ListExtr | 100% | 1 |
|  | ListIter-2 | 100% | 1 |  | ListIter | 100% | 3 |
| S24 | Language | 100% | 1 | S26 | House | 100% | 1 |
|  | URL | 91% | 10 |  | Number | 100% | 1 |
|  | Image | 100% | 6 |  | Price | 97% | 10 |
|  | Translat. | 89% | 10 |  | Artist | 100% | 1 |
|  | ListExtr-1 | 100% | 1 |  | Album | 71% | 1 |
|  | ListIter-1 | 100% | 1 |  | ListExtr-1 | 100% | 1 |
|  | ListExtr-2 | 100% | 1 |  | ListIter-1 | 100% | 1 |
|  | ListIter-2 | 91% | 10 |  | ListExtr-2 | 99% | 10 |
|  |  |  |  |  | ListIter-2 | 100% | 1 |

FIGURE 20

WRAPPER INDUCTION BY HIERARCHICAL DATA ANALYSIS

CROSS-REFERENCES TO RELATED APPLICATIONS

This application is related to U.S. Provisional Patent Application No. 60/137,783 filed Jun. 3, 1999 now provisional Application expired, for Hierarchical Rule Induction for Extracting Data from Semistructured Documents.

STATEMENT AS TO RIGHTS TO INVENTIONS MADE UNDER FEDERALLY-SPONSORED RESEARCH AND DEVELOPMENT

The invention set forth herein was developed through the following and other grants: the National Science Foundation under grant number IRL-9610014, the U.S. Air Force under contract number F49620-98-1-0046, the Defense Logistics Agency, DARPA, and Fort Huachuca under contract number DABT63-96-C-0066.

BACKGROUND OF THE INVENTION

1. Field of the Invention

This invention relates to information wrapper generating methods and more particularly to machine learning method for wrapper construction that enables easier generation of wrappers.

2. Description of the Related Art

With the expansion of the Web, computer users have gained access to a large variety of comprehensive information repositories. However, the Web is based on a browsing paradigm that makes it difficult to retrieve and integrate data from multiple sources. The most recent generation of information agents (e.g., WHIRL, Ariadne, and Information Manifold) address this problem by enabling information from pre-specified sets of Web sites to be accessed via database-like queries. For instance, the query "What seafood restaurants in L.A. have prices below $20 and accept the Visa credit card?" may be considered as an example. Assume that there are two information sources that provide information about L.A. restaurants: the Zagat Guide and L.A. Weekly (see FIG. 1). To answer this query, an information agent could use Zagat to identify seafood restaurants under $20 and then use L.A. Weekly to check which of these accepts Visa.

Information agents generally rely on "wrappers" to extract information from semistructured Web pages. A page is semistructured if the desired information can be located using a concise, formal grammar. Each wrapper consists of a set of extraction rules and the code required to apply those rules to the semistructured Web pages. Some systems, such as TSIMMIS and ARANEUS depend on humans to write the necessary grammar rules. However, there are several reasons why this is undesirable. Writing extraction rules is tedious, time consuming, and requires a high level of expertise. These difficulties are multiplied when an application domain involves a large number of existing sources or the format of the source documents changes over time. It would be much more advantageous to have information agents that could accommodate the flexibility and spontaneous nature of the Web so that desired information can be gleaned from any format of presentation.

Research on learning extraction rules has occurred mainly in two contexts: creating wrappers for information agents and developing general purpose information extraction systems for natural language text. The former are primarily used for semistructured information sources, and their extraction rules rely heavily on the regularities in the structure of the documents; the latter are applied to free text documents and use extraction patterns that are based on syntactic and semantic information.

With the increasing interest in accessing Web-based information sources, a significant number of research projects depend on wrappers to retrieve the relevant data. A wide variety of languages have been developed for manually writing wrappers (i.e., where the extraction rules are written by a human expert), from procedural languages and Perl scripts to pattern matching and LL(k) grammars. Even though these systems offer fairly expressive extraction languages, manual wrapper generation is a tedious, time consuming task that requires a high level of expertise. Furthermore, the rules for the wrappers have to be rewritten whenever the sources suffer format changes. In order to help the users cope with these difficulties, Ashish and Knoblock proposed an expert system approach that uses a fixed set of heuristics of the type "look for bold or italicized strings".

The wrapper induction techniques introduced in WIEN (Kushmerick, 1997) are better fit to frequent format changes because they rely on learning techniques to generate the extraction rules. Compared to the manual wrapper generation, Kushmerick's approach has the advantage of dramatically reducing both the time and the effort required to wrap a source; however, his extraction language is significantly less expressive than the ones provided by the manual approaches. In fact, the WIEN extraction language is a 1-disjunctive LA (landmark automaton, below) that is interpreted as a SkipTo( ) and does not allow the use of wildcards. There are several other important differences between STALKER (the present invention) and WIEN. First, as WIEN learns the landmarks by searching common prefixes at the character level, it needs more training examples than STALKER. Second, WIEN cannot wrap sources in which some items are missing or appearing in various orders. Last but not least, STALKER can handle EC (embedded catalog) trees of arbitrary depths, while WIEN's approach to nested documents turn out to be prohibitive in terms of CPU time.

SoftMealy (Hsu and Dung) uses a wrapper induction algorithm that generates extraction rules expressed as finite transducers. The SoftMealy rules are more general than the WIEN ones because they use wildcards and they can handle both missing items and items appearing in various orders. The SoftMealy extraction language is a k-disjunctive LA, where each disjunct is either a SkipTo( )Next Landmark( ) or a single SkipTo( ). As SoftMealy does not use either multiple SkipTo( )s nor SkipUntil( )s, it follows that its extraction rules are strictly less expressive than STALKER's. Finally, SoftMealy has one additional drawback: in order to deal with missing items and various orderings of items, SoftMealy has to see training examples that include each possible ordering of the items.

In contrast to information agents, most general purpose information extraction systems are based on unstructured text, and therefore the extraction techniques text are based on linguistic constraints. However, there are three such systems that are somewhat related to STALKER: WHISK, Rapier, and SRV. The extraction rules induced by Rapier and SRV can use the landmarks that immediately precede and/or follow the item to be extracted, while WHISK is capable of using multiple landmarks. But, similarly to STALKER and unlike WHISK, Rapier and SRV extract a particular item independently of the other relevant items. It follows that WHISK has the same drawback as SoftMealy: in order to handle correctly missing items and items that appear in various orders, WHISK must see training examples for each possible ordering of the items. None of these three can handle embedded data though all use powerful linguistic constraints that are beyond STALKER's capabilities.

SUMMARY OF THE INVENTION

The present invention provides means by which extraction rules for wrappers may be automatically generated when correct examples have been provided previously. Using a graphical user interface, a user marks or indicates information that is desired from a realm of similar data collections. For example, if one set of Web pages is marked for addresses, the graphical user interface (GUI) transmits or passes the relevant token sequences identifying the borders, perimeters, and/or prefix/suffix of the indicated portion to a rule-generating program/system denominated herein as STALKER. STALKER then takes these collections of token sequences in the context that they identify certain data fields of interest, in this case addresses. STALKER then takes the examples and generates rules by means of the token sequences and derivatives thereof in order to determine extraction rules for wrappers.

This process of extracting rules for wrappers is highly advantageous as the wrappers are then able to go out to other data collections, such as other Web pages, and extract the address or other desired information. This makes available the coherent, controlled, predictable and facile operation-generation of information agents. Such agents can be unleashed upon data collections to extract the desired information. An information automaton is then achievable that may allow the user to gather information from an identified and semi-structured source. While suffering some limitations, the present invention may provide a stepping stone to an ultimate goal of harvesting information from unpredictable, but stable, information sources such as the Internet itself. The user does not need to know the range or extent of the information base, just that information is present and that a utility can be achieved by which information of interest can be extracted and returned to the user. The user then has control over the information he or she wants and can choose almost any kind or type of information for return from the vast information reservoir that is the Internet, or other data collection.

The primary contribution of the present invention is to turn a potentially hard problem—learning extraction rules—into a problem that is extremely easy in practice (i.e., typically very few examples are required). The number of required examples is small because the EC (embedded catalog) description of a page simplifies the problem tremendously: as the Web pages are intended to be human readable, the EC structure is generally reflected by actual landmarks on the page. STALKER merely has to find the landmarks, which are generally in the close proximity of the items to be extracted. In other words, given SLG (simple landmark grammar) formalism, the extraction rules are typically very small, and, consequently, they are easy to induce.

OBJECTS OF THE INVENTION

It is an object of the present invention to provide a system for generating extraction rules for wrappers or the like.

It is another object of the present invention to provide a wrapper rule generator that is easy to use.

It is yet another object of the present invention to provide a wrapper rule generator that is reliable.

It is yet another object of the present invention to provide a wrapper rule generator that can suffer exceptions or irregulates in data patterns.

It is yet another object of the present invention to generate a wrapper rule generator that has a high percentage of correct extractions.

These and other objects and advantages of the present invention will be apparent from a review of the following specification and accompanying drawings.

BRIEF DESCRIPTION OF THE DRAWINGS

Figure 1:
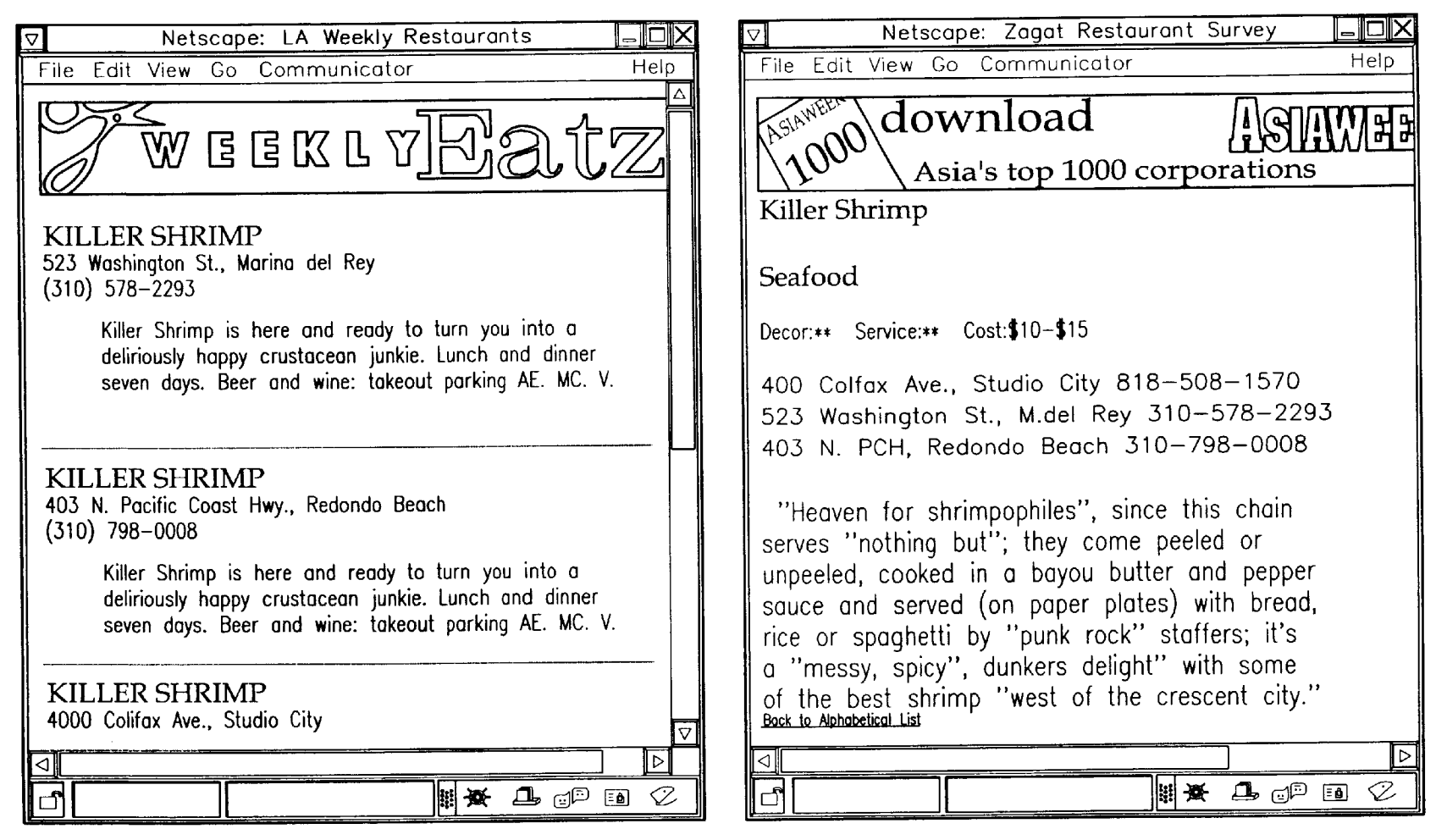

FIG. 1 is a presentation of exemplary Web pages from which information might be extracted according to the present invention.

FIG. 4 is a formatted HTML listing of address information that might be subject to operation along the lines of the present invention.

FIG. 6 is a listing of pseudocode for the STALKER algorithm of the present invention.

FIGS. 9–11 are tables showing comparative operation of the present invention.

FIG. 9 provides an indication of illustrative information sources and characteristics thereof.

FIG. 10 shows an operation comparison of the WIEN and STALKER processes.

FIG. 11 compares STALKER operation on the S1 and S2 sources indicated in FIG. 9.

FIG. 13 is a text listing of pseudocode usable for the present invention.

FIG. 14 is a text listing of heuristic characteristics of GetBestRefiner( ) and GetBestSolution( ).

FIG. 15 is a text listing of rules generated from the topological refinement process of the present invention.

FIG. 16 is a table comparing performance between the WIEN system and the STALKER of the present invention.

FIG. 17 is a table comparing operation of the WIEN system and the STALKER system of the present invention for sources perfectly wrapped by each system.

FIG. 18 is a table indicating STALKER performance for sources it wraps perfectly yet WIEN fails to wrap.

FIG. 19 is a table indicating sources where WIEN performs better than STALKER.

FIG. 20 is a table comparing performance between WIEN and STALKER for sources WIEN fails and STALKER wraps imperfectly.

DESCRIPTION OF THE PREFERRED EMBODIMENT(S)

The detailed description set forth below in connection with the appended drawings is intended as a description of presently-preferred embodiments of the invention and is not intended to represent the only forms in which the present invention may be constructed and/or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

Because Web pages are intended to be human readable, there are some common conventions for structuring HTML pages. For instance, the information on a page often exhibits some hierarchical structure; furthermore, semistructured information is often presented in the form of lists of tuples, with explicit separators used to distinguish the different elements. With these observations in mind, the present invention uses an embedded catalog (EC) formalism, which can describe the structure of a wide range of semistructured documents.

Figure 2:
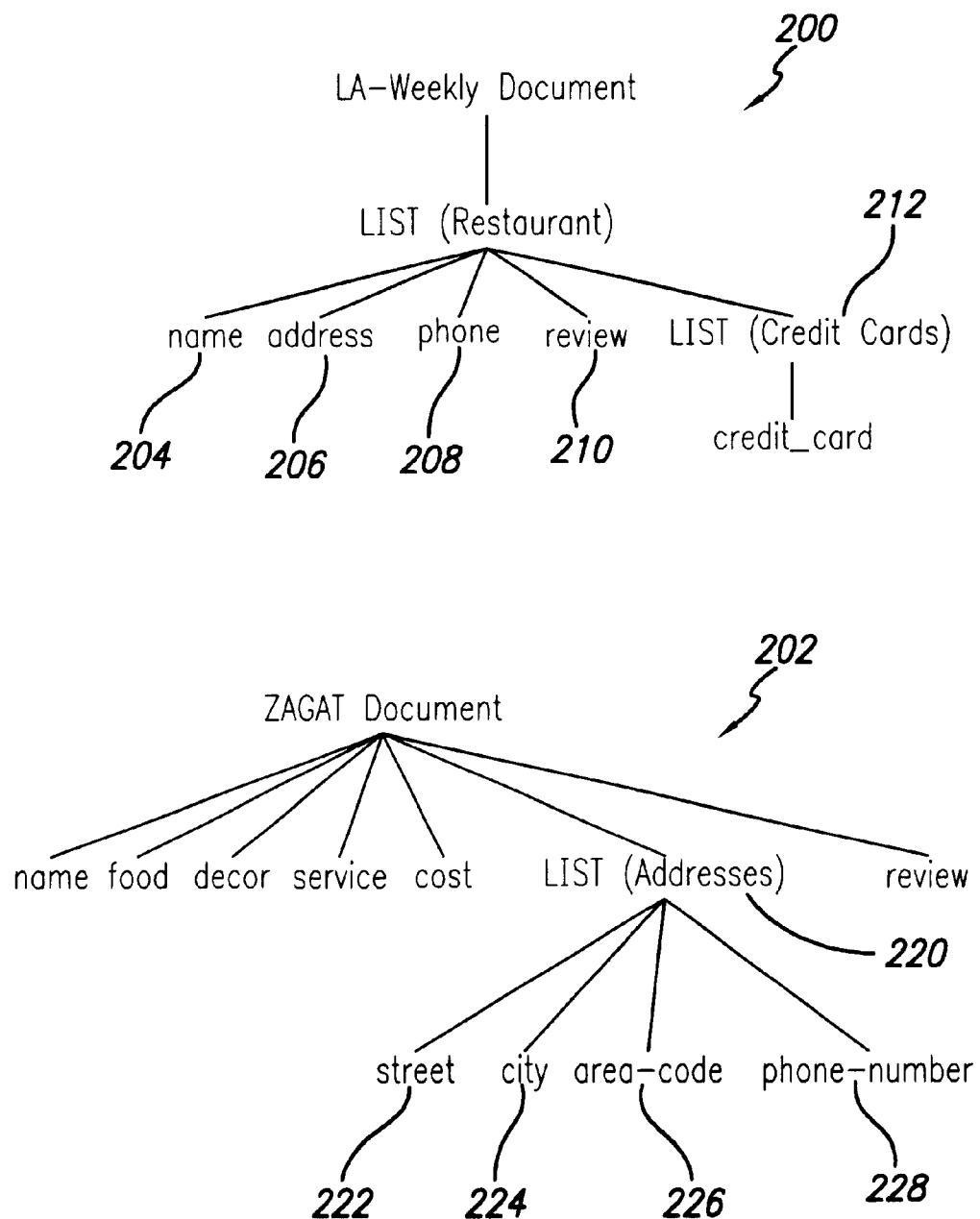
FIG. 2 shows a corresponding embedded catalog structures derived from the Web pages shown in FIG. 1.

The EC description of a page is a tree-like structure in which the leaves are the items of interest for the user (i.e., they represent the relevant data). The internal nodes of the EC tree represent lists of k-tuples (e.g., lists of restaurant descriptions), where each item in the k-tuple can be either a leaf 1 or another list L (in which case L is called an embedded list). For instance, FIG. 2 displays the EC descriptions of the L.A. Weekly and Zagat 202 pages. At the top level, an L.A. Weekly page 200 is a list of 5-tuples that contain the name 204, address 206, phone 208, review 210, and an embedded list 212 of credit cards. Similarly, a Zagat 202 document can be seen as a 7-tuple that includes a list of addresses 220, where each individual address is a 4-tuple street 222, city 224, area code 226, and phone number 228.

Given the EC description of a document together with an extraction rule attached to each edge and a list iteration rule associated with each list node, a wrapper can extract any item of interest (i.e., any leaf) by simply determining the path P from the root to the corresponding leaf and by successively extracting each node $x \in P$ from its parent p. In order to extract x from p, the wrapper applies the extraction rule r that is attached to the edge (p, x); if p is a list node, the wrapper has to apply first the iteration rule that decomposes p into individual tuples, and then it applies r to each extracted tuple.

In the framework of the present invention, a document is a series of tokens ST (e.g., words, numbers, HTML tags, etc.). It follows that the content of the root node in the EC tree is the whole sequence ST, while the content of each of its children is a subsequence of ST. More generally, the content of an arbitrary node x represents a subsequence of the content of its parent p. A key idea underlying the present invention is that the extraction rules can be based on "landmarks" (i.e., groups of consecutive tokens) that enable a wrapper agent to locate the content of x within the content of p.

Figure 3:
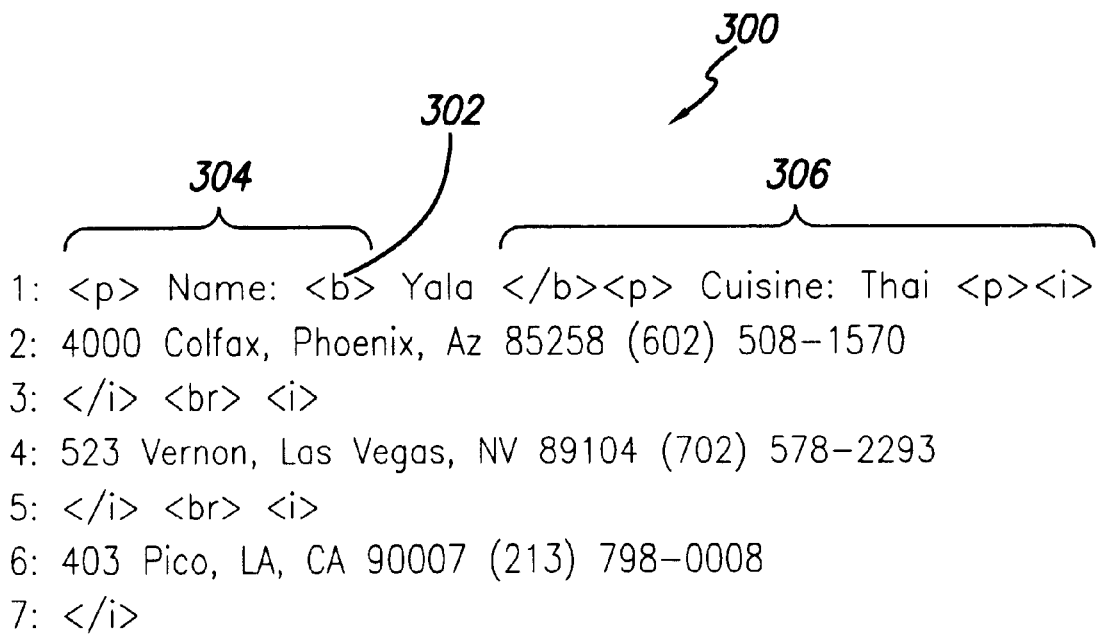
FIG. 3 is a formatted HTML listing of restaurant information.

Referring now to FIG. 3, in order to identify the beginning of the restaurant name 300, we can use the rule R1=SkipTo(<b>)

which has the following meaning: start from the beginning of the document and skip everything until you find the <b> landmark 302. More formally, the rule R1 is applied to the content of the node's parent, which in this particular case is the whole document; the effect of applying R1 consists of consuming the prefix 304 of the parent, which ends at the beginning of the restaurant name. Similarly, one can identify the end of a node's content by applying the rule that consumes the corresponding suffix 306 of the parent. For instance, in order to find the end of the restaurant name 300, one can apply the rule R2 SkipTo(</b>)

from the end of the document towards its beginning. The suffix marked in FIG. 3 indicates the part of the suffix closest to the restaurant name.

The rules R1 and R2 are called start and end rules, and, in most of the cases, they are not unique. For instance, we can replace R1 either by R3=SkipTo(Name) SkipTo(<b>)

or by

R4=SkipTo(Name Symbol HtmlTag)

R3 has the meaning "ignore everything until you find a Name landmark, and then, again, ignore everything until you find <b>", while R4 is interpreted as "ignore all tokens until you find a 3-token landmark that consists of the token Name, immediately followed by a punctuation sign and an HTML tag". As the rules above successfully identify the start of the restaurant name 300, we say that they match correctly. By contrast, the start rules SkipTo(:) and SkipTo(<i>) are said to match incorrectly because they consume too few or too many tokens, respectively, were they to be used to find the restaurant name 300. Finally, a rule like SkipTo(<table>) fails because the landmark <table> does not exist in the document.

In order to deal with variations in the format of the documents, the extraction rules allow the use of disjunctions. For example, if the names of the recommended restaurants appear in bold, while the other ones are displayed as italic, one can extract all the names based on the disjunctive start and end rules:

either SkipTo(<b>) or SkipTo(<i>) and either SkipTo(</b>) or SkipTo(Cuisine)SkipTo(</i>)

A disjunctive rule matches if at least one of its disjuncts matches. In case several disjuncts match, we nondeterministically choose one of the matching disjuncts.

To illustrate how the extraction process works for list members, consideration may be made of the case where the wrapper agent has to extract all the area codes from a sample document. In this case, the agent (implementing its extraction rules) starts by extracting the entire list of addresses, which can be done based on the start rule SkipTo(<p> <i>) and the end rule SkipTo(</i>). The wrapper then has to iterate through the content of LIST(Addresses) (lines 2–6 in FIG. 3) and to break it into individual tuples. In order to find the start of each individual address, the agent repeatedly applies SkipTo(<i>) to the content of the list (each successive rule-matching starts at the point where the previous one ended). Similarly, the agent determines the end of each tuple by repeatedly applying the end rule SkipTo(</i>). In our example, the list iteration process leads to the creation of three individual addresses that have the contents shown on the lines 2, 4, and 6, respectively of FIG. 3. Then the wrapper applies to each address the area code start and end rule (e.g., SkipTo('(') and SkipTo(')'), respectively).

If, instead of the area codes, the wrapper has to extract the ZIP codes the following process may occur. The list extraction and the list iteration remain unchanged, but the ZIP code extraction is more difficult because there is no landmark that separates the state from the ZIP code. Even though in such situations the SkipTo( ) rules are not sufficiently expressive, they can be easily extended to a more powerful extraction language. For instance, we can use either R5=SkipTo(,) SkipUntil(Number)

or

R6=SkipTo(AllCaps) NextLandmark(Number)

to find the ZIP code from the entire address. The arguments of SkipUntil( ) and NextLandmark( ) describe a prefix of the content of the item to be extracted, and they are not consumed when the rule is applied (i.e., the rules stop immediately before their occurrence). The rule R5 means "ignore all tokens until you find the landmark (,) and then ignore everything until you find, but do not consume, a number". Similarly, R6 is interpreted as "ignore all tokens until you encounter an AllCaps word, and make sure that the next landmark is a number". In other words, the only difference between SkipTo($l_1$) SkipUntil($l_2$) and SkipTo($l_1$) NextLandmark($l_2$) consists of the way $l_2$ is matched: the former allows any number of tokens between $l_1$ and $l_2$, while the later requires that the landmark $l_2$ immediately follows $l_1$. Rules like R5 and R6 can be extremely useful in practice, and they represent only variations of the SkipTo( ) rules in which the last landmark has a special meaning. Focus here is mainly upon SkipTo( ) rules. Explanation is also made herein regarding the way in which the approach of the present system can be extended to also handle SkipUntil( ) and NextLandmark( ).

The extraction rules presented herein have two main advantages. First of all, the hierarchical extraction based on the EC tree allows one agent to wrap information sources that have arbitrary many levels of embedded data. Second, as each node is extracted independently of its siblings, the system set forth herein does not rely on there being a fixed ordering of the items, and extraction tasks can be easily handled from documents that may have missing items or items that appear in various orders. Consequently, in the context of using an inductive algorithm that generates the extraction rules, the present system turns an extremely hard problem into several simpler ones: rather than finding a single extraction rule that takes into account all possible item orderings and becomes more complex as the depth of the EC tree increases, several simpler rules are created that deal with the easier task of extracting each item from its EC tree parent.

Two key concepts can be used to define extraction rules: landmarks and landmark automata. In the rules described previously, each argument of a SkipTo( ) function is a landmark, while a group of SkipTo( )s that must be applied in a pre-established order represents a landmark automaton. In other words, the extraction rules given above are landmark automata.

Focus is made herein on a particular type of landmark: the linear landmark. A linear landmark is described by a sequence of tokens and wildcards (a wildcard represents a class of tokens, as illustrated in the previous section, where we used the wildcards Number, Sign, and HtmlTag). Linear landmarks are interesting for two reasons: on one hand, they are sufficiently expressive to allow efficient navigation within the EC structure of the documents, and, on the other hand, as we will see in the next section, there is a simple way to generate and refine linear landmarks during learning.

Landmark automata (LAs) are nondeterministic finite automata in which each transition $S_i \sim S_j$ ($i \pm j$) is labeled by a landmark $l_{i,j}$; that is, the transition $$l_{i,j}$$

$$S_i \sim S_j$$

takes place if and only if, in the state $S_i$, the input is a string s that is accepted by the landmark $l_{ij}$. Simple Landmark Grammars (SLGS) are the class of LAs that correspond to the disjunctive rules introduced in the previous section. Any SLG has the following properties:

the initial state $S_0$ has a branching factor of k;

it has exactly k accepting states (one per branch);

all k branches that leave $S_0$ are sequential LAs (i.e., from each non-accepting states $S_i$, there are exactly two possible transitions: a loop to itself and a transition to the next state;

linear landmarks label each non-looping transition; and all looping transitions have the meaning "consume all tokens until you encounter the linear landmark that leads to the next state".

The STALKER inductive algorithm generates SLG rules that identify the start and end of an item x within its parent p. Note that finding a start rule that consumes the prefix of p with respect to x (for short, $Prefix_x(p)$ is similar to finding an end rule that consumes the suffix of p with respect to x (i.e., $Suffix_x(p)$) in fact, the only difference between the two types of rules consists of how they are actually applied: the former starts by consuming the first token in p and goes towards the last one, while the later starts at the last token in p and goes towards the first one. Consequently, without any loss of generality, focus herein is only made upon the way in which STALKER generates SLG start rules.

The input to STALKER is a set of sequences of tokens that represent the prefixes that must be consumed by the induced rule. In order to create needed training examples, the user has to select a few sample pages and to use a graphical user interface (GUI) (or otherwise) to mark up the relevant data (i.e., the leaves of the EC tree); once a page is marked up, the GUI generates the sequences of tokens that represent the content of the parent p, together with the index of the token that represents the start of x and uniquely identifies the prefix to be consumed by the induced SLG.

For instance, if the user marked the four area codes 402 from FIG. 4 and invokes STALKER on the corresponding four training examples (that is, the prefixes of the addresses E1, E2, E3, and E4 that end immediately before the area code). STALKER, which is a sequential covering algorithm, begins by generating a linear LA that covers as many as possible of the four positive examples. Then it tries to create another linear LA for the remaining examples, and so on. Once STALKER covers all examples, it returns the disjunction of all the induced LAs. In our example, the algorithm generates first the rule R1::=SkipTo(( ), which has two important properties:

it accepts the positive examples in E2 and E4;

it rejects both E1 and E3 because R1 can not be matched on them.

Figure 5:
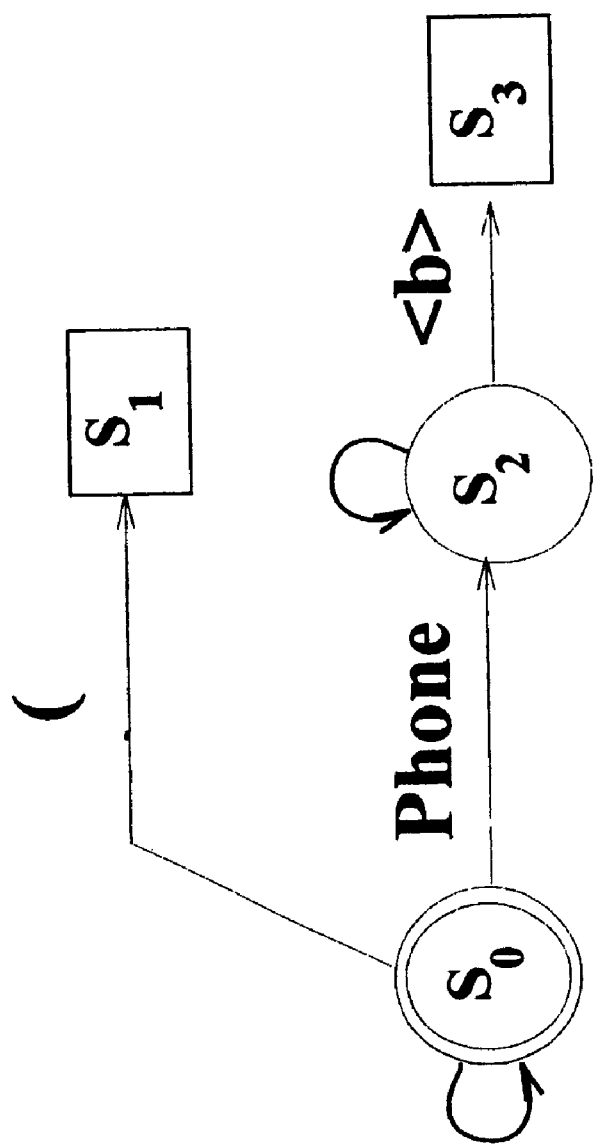
FIG. 5 is a schematic diagram of a disjunctive rule set as possibly generated by the present invention.

During a second iteration, the algorithm considers only the uncovered examples E1 and E3, and it generates the rule R2::=SkipTo(Phone) SkipTo(<b>). In FIG. 5, we show the SLG that is equivalent to the disjunctive rule either R1 or R2.

In order to generate a rule R that extracts x from its parent p, STALKER (see FIG. 6) has to induce the number of disjuncts in R together with the number and the actual values of the landmarks that form each disjunct. STALKER's input (from the marked examples in the GUI, above) consists of pairs ($T_i$, $Idx_i$,), where each sequence of tokens $T_i$ is the content of an instance of $p_i$, and $T_i[Idx_i]$ is the token that represents the start of x within p. Any sequence S::=$T_i$ [1], $T_i$[2], . . . , $T_i[Idx_i-1]$ (i.e., any instance of $Prefix_x(p)$) represents a positive example, while any other sub-sequence or super-sequence of S represents a negative example. STALKER tries to generate an SLG that accepts all positive examples and rejects all negative ones.

STALKER is a typical sequential covering algorithm: as long as there are some uncovered positive examples, it tries to learn a perfect disjunct (i.e., a sequential LA that accepts only true positives). When all the positive examples are covered, STALKER returns to the solution, which consists of an SLG in which each branch corresponds to a learned disjunct.

The function LearnDisjunct( ) is a brute force algorithm for learning perfect disjuncts: it generates an initial set of candidates and repeatedly selects and refines the best candidate until either it finds a perfect disjunct, or it runs out of candidates. To find the best disjunct in Candidates, STALKER looks for a disjunct D that accepts the largest number of positive examples. In case of a tie, the best disjunct is the one that accepts fewer false positives.

Each initial candidate is a 2-state landmark automaton in which the transition $S_0 \sim S_1$ is labeled by a landmark that is either a token t that ends one $Prefix_x(p)$, or a wildcard that "matches" such a t. The rationale behind the choice of the initial candidates is straightforward: as disjuncts have to completely consume each positive example, it follows that any disjunct that consumes a t-ended prefix must end with a landmark that consumes the trailing t.

Intuitively, the Refine( ) function tries to obtain (potentially) better disjuncts either by making its landmarks more specific (landmark refinements), or by adding new states in the automation (topology refinements). In order to perform a refinement, STALKER uses a refining terminal, which can be either a token or a wildcard (besides the seven predefined wildcards Numeric, AlphaNumeric, Alphabetic, Capitalized, AllCaps, HtmlTag, and Symbol, STALKER can also use domain specific wildcards that are defined by the user). The refining tokens are computed by GetTokens( ), which returns all tokens that appear at least once in each training example.

Given a disjunct D, a landmark l from D, and a refining terminal t, a landmark refinement makes l more specific by concatenating t either at the beginning or at the end of l. By contrast, a topology refinement adds a new state S and leaves the existing landmarks unchanged. For instance, if D has a transition A$\sim^l$ B (i.e., the transition from A to B) is labeled by the landmark l, then given a refining terminal t, a topology refinement creates two new disjuncts in which the transition above is replaced either by A$\sim^l$ S$\sim^t$ B or by A$\sim^t$ S$\sim^l$ B.

Finally, STALKER can be easily extended such that it also uses the SkipUntil( ) and Next Landmark( ) features. The rule refining process remains unchanged as the two new features change only the meaning of the last landmark in a disjunct, and the only modification involves GenerateInitialCandidates( ). More precisely, for each initial candidate SkipTo(t) and each wildcard w that matches the first token in an instance of x, STALKER must also generate the initial candidates SkipTo(t)SkipUntil(w) and SkipTo(t), NextLandmark(w).

Figure 8:
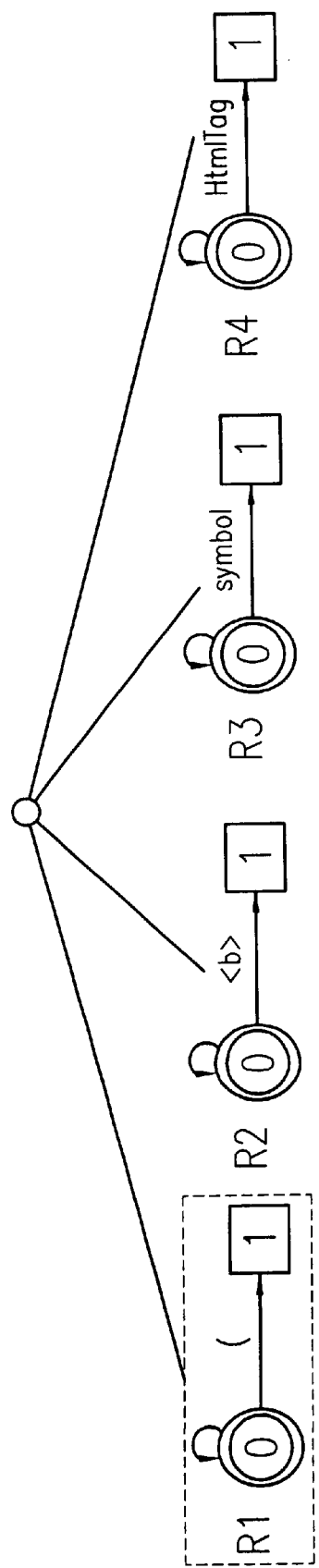
FIG. 8 is a listing of potential initial rules as generated via the present invention.

Returning to the restaurant addresses from FIG. 4, in order to generate an extraction rule for the area code, STALKER may be invoked with the training examples (E1, E2, E3, E4). During the first iteration, LearnDisjunct( ) creates the four initial candidates shown in FIG. 8; that is, one for each token that ends a $Prefix_x(p)$ (i.e., R1 and R2), and one for each wildcard that matches such a token (i.e., R3 and R4). As R1 is a perfect disjunct (in that it correctly matched several examples (e.g. E2 and E4) and rejects all other examples), LearnDisjunct( ) returns R1 and the first iteration ends.

During the second iteration, LearnDisjunct( ) is invoked with the uncovered training examples {E1, E3} and computes the set of refining terminals.

{Phone <b> </b>: ,. HtmlTag Word Symbol}

Figure 7:
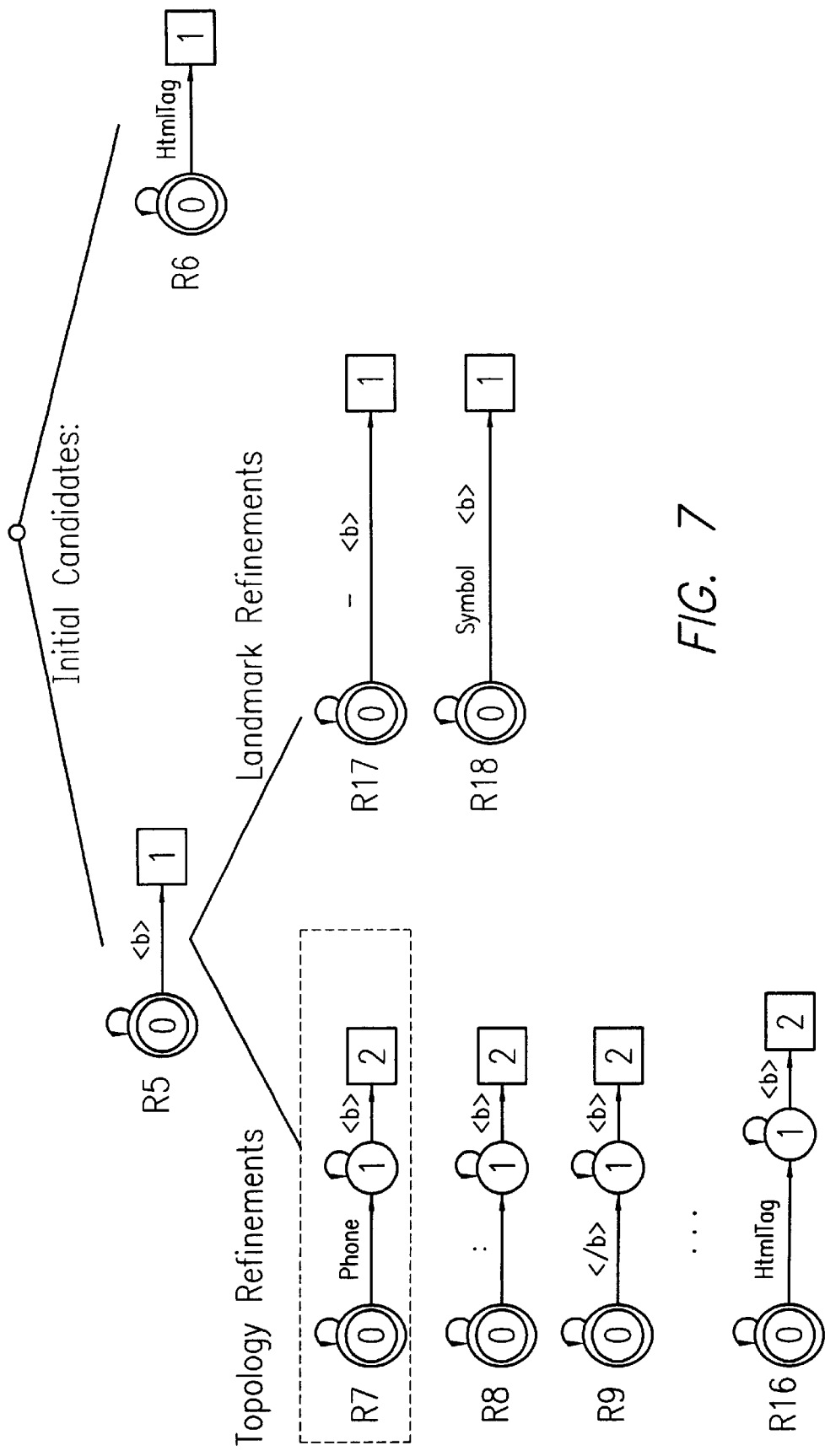
FIG. 7 is a structured tree diagram showing landmark automaton rules according to the present invention.

Then LearnDisjunct( ) generates the initial candidate rules R5 and R6 (see FIG. 7). As both candidates accept the same false positives (i.e., the prefix of each example that ends before the city name), LearnDisjunct( ) randomly selects the rule to be refined first—for example R5. By refining R5, STALKER creates the topological refinements R7, R8, . . . , R16 (FIG. 7 shows only four of them), together with the landmark refinements R17 and R18.

As R7 is a perfect disjunct (i.e., it covers both E1 and E3), there is no need for additional iterations as both examples have been covered. Coupled with the first iteration, this second iteration covers all examples. Finally, STALKER completes its execution by returning the disjunctive rule: either R1 or R7.

In Table 1 (FIG. 9), four illustrative information sources were selected and tested from the larger set of sources on which Kushmerick's WIEN system were tested. All WIEN sources can be obtained from the RISE repository. S1 and S2 are the hardest sources that WIEN could wrap (i.e., they required the largest number of training examples), while S3 and S4 were beyond WIEN's capabilities because they have missing items and/or items that appear in various orders. For each source, Table 1 provides the following information: the name of the source, the number of leaves in the EC tree, the number of documents that were used by Kushmerick to generate training and test examples, and the average number of occurrences of each item in the given set of documents. Each of the sources in Table 1 is a list of k-tuples, where k is the number of leaves from Table 1; consequently, in all four cases, the learning problem consists of finding one list extraction rule (i.e., a rule that can extract the whole list from the page), one list iteration rule, and k item extraction rules (one rule for each of the k leaves).

In practice, a user rarely has the patience of labeling more than a dozen training examples. An important main point of the experiments was to verify whether or not STALKER can generate high accuracy rules based just on a few training examples. The experimental setup was the following: starting with one randomly chosen training example, learning an extraction rule, and testing it against all the unseen examples. These steps were repeated 500 times. The number of test examples that were correctly extracted were averaged. The same procedure was repeated with 2, 3, . . . , and 10 training examples. The STALKER system was found to usually require less than 10 examples to obtain a 97% average accuracy over 500 trials.

The 97% average accuracy means that out of the 500 learned rules, about 485 were capable of extracting correctly all the relevant data, while the other 15 rules were erroneous. This behavior has a simple explanation: as most information sources allow some variations in the document format, in the rare cases when a training set does not include the whole spectrum of variations or, even worse, when all the training examples are instances of the same type of document, the learned extraction rules perform poorly on some of the unseen examples.

Table 2 (FIG. 10) shows some illustrative figures for WIEN and STALKER based on their respective performances on the four test domains. These numbers can not be used for a rigorous comparison for several reasons. First, the WIEN data was collected for 100% accurate extraction rules, while we stopped the experiments after reaching either the 97% accuracy threshold or after training on 10 examples. Second, the two systems were not run on the same machine. Finally, as WIEN considers that a training example is a completely labeled document and each document contains several instances of the same item, Kushmerick's original numbers were converted by multiplying them with the average number of occurrences per page (remember that in the STALKER framework each occurrence of an item within a document is considered a distinct training example).

The results from Table 2 are notable. First, STALKER needs only a few training examples to wrap S1 and S2 with a 97% accuracy, while WIEN finds perfect rules, but requires up to two orders of magnitude more examples. Second, even for a significantly more difficult source like S3, which allows both missing items and items that appear in various orders (in fact, S3 also allows an item to have several occurrences within the same tuple), STALKER can learn extraction rules with accuracies ranging between 85% and 100%. Third, based on as few as 10 examples, STALKER could wrap S4 with a median correctness of 79% over all 18 relevant items. This last figure is reasonable considering that some of the documents in S4 contain so many errors and formatting exceptions that a knowledgeable individual who was given access to all available documents, required several hours to handcraft a set of extraction rules that were 88% correct. Last but not least, STALKER is reasonably fast: the easier sources S1 and S2 are completely wrapped in less than 20 seconds, while the more difficult sources take less than 40 seconds per item.

Table 3 (FIG. 11) provides detailed data for each extraction task in S1 and S2. More precisely, for each extraction rule learned by STALKER, Table 3 shows its accuracy and the number of examples required to reach it. As the documents in S1 have an extremely regular structure, except for the list extraction rule, all other rules have a 100% accuracy based on a single training example. This is a remarkable occurrence. The source S2 is more difficult to wrap. Even though half of the rules have a 100% accuracy, they can be induced only based on three or four examples. Furthermore, the other four rules can not achieve a 100% accuracy even based on 10 training examples.

Figure 12:
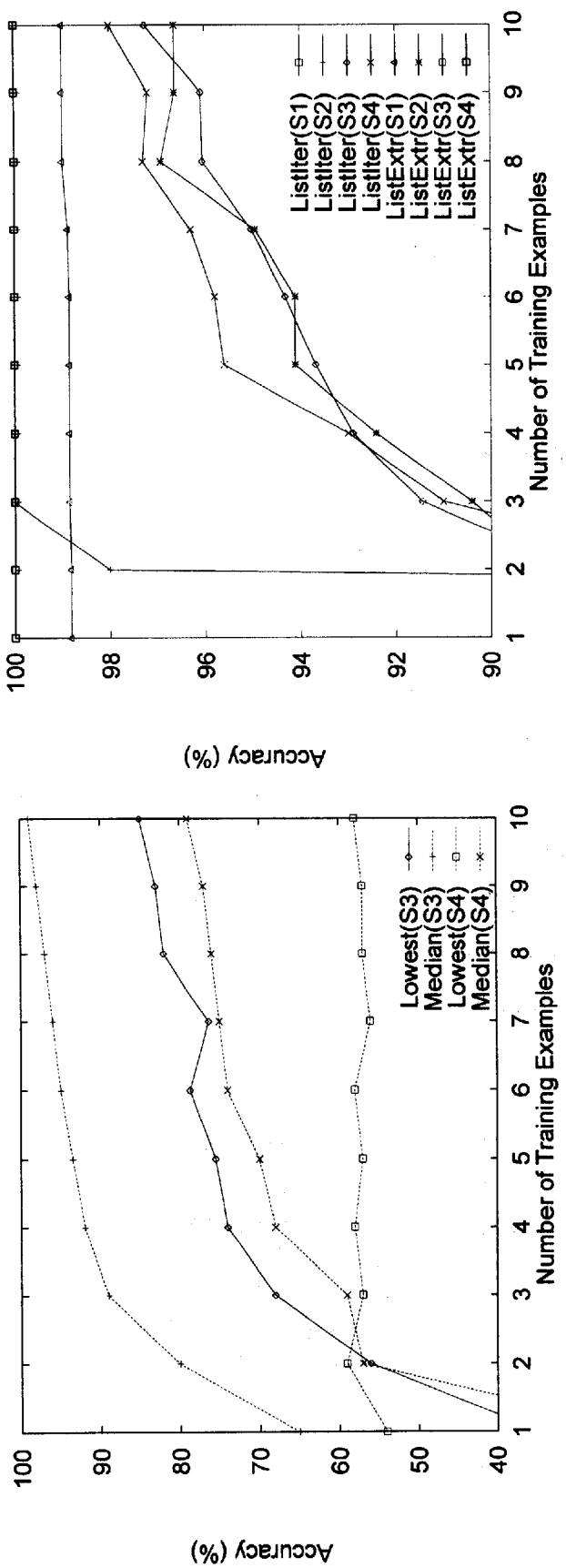
FIG. 12 shows graphical information regarding the operation of the present invention indicating increased accuracy with the greater number of training examples.

In order to better understand STALKER's behavior on difficult extraction tasks, FIG. 12 shows the learning curves for the lowest and median accuracy extraction tasks for both S3 and S4. For S3, the hardest extraction task can be achieved with a 85% accuracy based on just 10 training examples; furthermore, the 99% accuracy of the median difficulty tasks indicates that half of the items can be extracted with an accuracy of at least 99%. Even though STALKER can not generate high accuracy rules for all the items in S4, our hierarchical approach, which extracts the items independently of their siblings in the EC tree, allows the user to extract at least the items for which STALKER generates accurate rules.

FIG. 12 shows the learning curves for the list extraction and list iterations tasks for all four sources. The learning curves for ListExtr(S3), ListExtr(S4), and ListIter(S1) are identical because all three learning tasks reach a 100% accuracy after seeing a single example. It is easy to see that independently of how difficult it is to induce all the extraction rules for a particular source, learning list extraction and list iteration rules is a straightforward process that converges quickly to an accuracy level above 95%. This fact strengthens the idea that the EC formalism is extremely useful to the breakdown of a hard problem into several easier ones.

Based on the results above two important conclusions can be drawn. First of all, since most of the relevant items are relatively easy to extract based on just a few training examples, it can be seen that the hierarchical approach to wrapper induction was beneficial in terms of reducing the amount of necessary training data. Second, the fact that even for the hardest items in S4 we can find a correct rule (remember that the low correctness comes from averaging correct rules with erroneous ones) means that we can try to improve STALKER's behavior based on active learning techniques that would allow the algorithm to select the few relevant cases that would lead to a correct rule.

Development of the present invention may take several directions. Unsupervised learning may be used in order to narrow the landmark search space. Active learning techniques may be used to minimize the amount of labeling that the user has to perform. A polynomial-time version of STALKER may be created and PAC-like guarantees provided for a new algorithm.

As an alternative (and possibly preferred embodiment), the input to STALKER may consist of sequences of tokens representing the prefixes that must be consumed by the induced rule. To create such training examples, the user has to select a few sample pages and to use a graphical user interface (GUI) to mark up the relevant data (i.e., the leaves of the EC tree). Once a page is marked up, the GUI generates the sequences of tokens that represent the content of the parent p, together with the index of the token that represents the start of x and uniquely identifies the prefix to be consumed.

As an illustrative example, it is assumed that the user has marked the four area codes from FIG. 4 and invokes STALKER on the corresponding four training examples (that is, the prefixes of the addresses E1, E2, E3, and E4 that end immediately before the area code). STALKER, which is a sequential covering algorithm, begins by generating a linear LA (each such LA represents a disjunct in the final rule) that covers as many as possible of the four positive examples. Then it tries to create another linear LA for the remaining examples, and so on. Once STALKER covers all examples, it returns the disjunction of all the induced LAs. In the example shown in FIG. 4, the algorithm generates first the rule D1::=SkipTo( ), which has two important properties:

it accepts the positive examples in E2 and E4;

it rejects both E1 and E3 because D1 can not be matched on them.

During a second iteration, the algorithm considers only the uncovered examples E1 and E3, based on which it generates the rule D2::=SkipTo(-<b>).

As there are no other uncovered examples, STALKER returns the disjunctive rule either D1 or D2.

To generate a rule that extracts an item x from its parent p, STALKER invokes the function LearnRule( ) (see FIG. 13). This function takes as input a list of pairs $(T_i, Idx_i)$, where each sequence of tokens $T_i$ is the content of an instance of p, and $T_i[Idx_i]$ is the token that represents the start of x within p. Any sequence $S::=T_i[1], T_i[2], \ldots, T_i[Idx_i-1]$ (i.e., any instance of $Prefix_x(p)$) represents a positive example, while any other sub-sequence or super-sequence of S represents a negative example. STALKER tries to generate a rule that accepts all positive examples and rejects all negative ones.

STALKER is a typical sequential covering algorithm: as long as there are some uncovered positive examples, it tries to learn a perfect disjunct (i.e., a linear LA that accepts only true positives). When all the positive examples are covered, STALKER returns the solution, which consists of an ordered list of all learned disjuncts. The ordering is performed by the function OrderDisjuncts( ) and is based on a straightforward heuristic: the disjuncts with fewer early and late matches should appear earlier; in case of a tie, the disjuncts with more correct matches are preferred to the other ones.

The function LearnDisjunct( ) is a greedy algorithm for learning perfect disjuncts: it generates an initial set of candidates and repeatedly selects and refines the best refining candidate until it either finds a perfect disjunct, or runs out of candidates. Before returning a learned disjunct, STALKER invokes PostProcess( ), which tries to improve the quality of the rule (i.e., it tries to reduce the chance that the disjunct will match a random sequence of tokens). This step is necessary because during the refining process each disjunct is kept as general as possible in order to potentially cover a maximal number of examples; once the refining ends, post-processing is performed on the disjunct in order to minimize its potential interference with other disjuncts.

Three types of post processing operations are currently contemplated: replacing wildcards with tokens, merging landmarks that match immediately after each other, and adding more tokens to the short landmarks (e.g., SkipTo (<b>) is likely to match in most html documents, while SkipTo (Maritime claims: <b>) matches in significantly fewer). The last operation has a marginal influence because it improves the accuracies of only three of the rules discussed below.

Both the initial candidates and their refined versions are generated based on a seed example, which is the shortest uncovered example (i.e., the example with the smallest number of tokens in $Prefix_x(p)$). For each token t that ends the seed example and for each wildcard $w_i$ that "matches" t, STALKER creates an initial candidate that is a 2-state LA. In each such automaton, the transition $S_0 \rightarrow S_1$ is labeled by a landmark that is either t or one of the wildcards $w_i$. The rationale behind this choice is straightforward: as disjuncts have to completely consume each positive example, it follows that any disjunct that consumes a t-ended prefix must end with a landmark that consumes the trailing t.

Before describing the actual refining process, it is useful to present the logic behind it. If the four training examples in FIG. 4 are considered, STALKER starts with the initial candidate SkipTo(( ), which is a perfect disjunct; consequently, STALKER removes the covered examples (E2 and E4) and generates the new initial candidate R0::= SkipTo(<b>). Note should be taken that R0 matches early in both uncovered examples E1 and E3 (that is, it does not consume the whole $Prefix_x(p)$), and, detrimentally, it also matches within the two already covered examples. In order to obtain a better disjunct, STALKER refines R0 by adding more terminals to it, thereby making it more unique, more specific. During the refining process, new candidates are sought that consume more tokens from the prefixes of the uncovered examples and fail on all other examples. By adding more terminals to a candidate, its refined versions should eventually turn the early matches into correct ones, while the late matches, together with the ones on the already covered examples, will become failed matches. This is exactly what happens when we refine R0 into R2::=SkipTo (–<b>): the new rule does not match anymore on E2 and E4, and R0's early matches on E1 and E3 become correct matches for R2. As above, a disjunct D that consumes more tokens than $Prefix_x(p)$ is called a late match on p. Adding more terminals to D cannot turn it into an early or a correct match as any refined version of D is guaranteed to consume at least as many tokens as D itself. Consequently, to avoid an incorrect match of D on p, terminals are added until D it fails to match on p.

The Refine( ) function in FIG. 13 tries to obtain (potentially) better disjuncts either by making its landmarks more specific (landmark refinements), or by adding new states in the automaton (topology refinements). In order to perform a refinement, STALKER uses a refining terminal, which can be either a token or a wildcard (besides the nine predefined wildcards Anything, Numeric, AlphaNumeric, Alphabetic, Capitalized, AllCaps, HtmlTag, NonHtml, and Punctuation, STALKER can also use domain specific wildcards that are defined by the user). A straightforward way to generate the refining terminals consists of using all the tokens in the seed example, together with the wildcards that match them. In one implementation of STALKER, a more efficient approach may be used: for the refinement of a landmark l, only the tokens from the seed example that are located after the point where l currently matches within the seed example may be used.

Given a disjunct D, a landmark l from D, and a refining terminal t, a landmark refinement makes l more specific by concatenating t either at the beginning or at the end of l. By contrast, a topology refinement adds a new state S and leaves the existing landmarks unchanged. For instance, if D has a transition $$A \xrightarrow{\ l\ } B$$

(i.e., the transition from A to B is labeled by the landmark l), then given a refining terminal t, a topology refinement creates a new disjunct in which the transition above is replaced by $$A \xrightarrow{\ t\ } S \xrightarrow{\ l\ } B$$

LearnDisjunct( ) uses different heuristics for selecting the best refining candidate and the best current solution, respectively. This fact has a straightforward explanation: as long as attempts are made to further refine a candidate, there is no concern as to how well it performs the extraction task. In most of the cases, a good refining candidate matches early on as many as possible of the uncovered examples; once a refining candidate extracts correctly from some of the training examples, any further refinements are used mainly to make it fail on the examples on which it still matches incorrectly.

In FIG. 13, one embodiment of the present invention may substitute "the 1-token landmark t immediately before $l_i$" for "the 1-token landmark t between $l_i$ and $l_{i+1}$" to provide more succinct and possibly better operation.

Both sets of heuristics are indicated in FIG. 14. GetBestRefiner( ) prefers candidates with a larger potential coverage (i.e., as many as possible early and correct matches). At equal coverage, it prefers a candidate with more early matches because, at the intuitive level, it is advantageous to prefer the most "regular" features in a document: a candidate that has only early matches is based on a regularity shared by all examples, while a candidate that also has some correct matches creates a dichotomy between the examples on which the existing landmarks work perfectly and the other ones. In case of a tie, STALKER selects the disjunct with more failed matches because the alternative would be late matches, which will have to be eventually turned into failed matches by further refinements. All things being equal, GetBestRefiner( ) prefers candidates that have fewer wildcards (a wildcard is more likely than a token to match by pure chance), fewer unconsumed tokens in the covered prefixes (as the main goal is to fully consume each prefix), and fewer tokens from the content of the slot to be extracted (the main assumption in wrapper induction is that all documents share the same underlying structure; consequently, it is advantageous to prefer extraction rules based on the document template to the ones that rely on the structure of a particular slot). Finally, the last heuristic consists of selecting the candidate that has longer landmarks closer to the item to be extracted; that is, it is advantageous to prefer more specific "local context" landmarks.

In order to pick the best current solution, STALKER uses a different set of criteria. It starts by selecting the candidate with the most correct matches. If there are several such disjuncts, it prefers the one that fails to match on most of the remaining examples (the alternatives, early or late matches, represent incorrect matches). In case of a tie, for reasons similar to the ones cited above, it is advantageous to prefer candidates that have fewer tokens from the content of the item, fewer wildcards, longer landmarks closer to the item's content, and fewer unconsumed tokens in the covered prefixes (i.e., in case of incorrect match, the result of the extraction contains fewer irrelevant tokens).

Finally, STALKER can be easily extended such that it also uses SkipUntil( ) constructs. The rule refining process remains unchanged (as SkipUntil( ) changes only the meaning of the last landmark in a disjunct), and the only modification involves GenerateInitialCandidates( ). More precisely, for each terminal t that matches the first token in an instance of x (including the token itself), STALKER also generates the initial candidates SkipUntil(t).

Referring now to the restaurant addresses from FIG. 4. In order to generate an extraction rule for the area-code, STALKER may be invoked with the training examples {E1, E2, E3, E4}. During the first iteration, LearnDisjunct( ) selects the shortest prefix, E2, as seed example. The last token to be consumed in E2 is "(", and there are two wildcards that match it: Punctuation and Anything; consequently, STALKER creates three initial candidates:

R1=SkipTo(( )
R2=SkipTo(Punctuation)
R3=SkipTo(Anything)

As R1 is a perfect disjunct that correctly matches at least one example (e.g., E2 and E4) and rejects all other ones, LearnDisjunct( ) returns R1 and the first iteration ends.

During the second iteration, LearnDisjunct( ) is invoked with the uncovered training examples {E1, E3}; the new seed example is E1, and STALKER creates again three initial candidates:

R4=SkipTo(<b>)
R5=SkipTo(HtmlTag)
R6=SkipTo(Anything)

As all three initial candidates match early in all uncovered examples, STALKER selects R4 as the best possible refiner because it uses no wildcards in the landmark. By refining R4, the following three landmark refinements are obtained:

R7=SkipTo(-<b>)
R8=SkipTo(Punctuation <b>)
R9=SkipTo(Anything <b>)

along with the 15 topology refinements shown in FIG. 15.

Two additional topology refinements are generated:

R25: SkipTo(513)SkipTo(<b>)
R26: SkipTo(Pico)SkipTo(<b>).

At this stage, several perfect disjuncts have been generated: R7, R11, R12, R13, R15, R16, and R19. They all match correctly on E1 and E3, and fail to match on E2 and E4; however, STALKER dismisses R19 because it is the only one using wildcards in its landmarks. Of the remaining six candidates, R7 represents the best solution because it has the longest end landmark (all other disjuncts end with a 1-token landmark). Consequently, LearnDisjunct( ) returns R7, and because there are no more uncovered examples, STALKER completes its execution by returning the disjunctive rule either R1 or R7.

In order to evaluate STALKER's capabilities, it was tested on the 30 information sources that were used as application domains by WIEN (Kushmerick, 1997), which was the first wrapper induction system. All these collections of sample documents, together with a detailed description of each extraction task, can be obtained from the RISE repository, which is located at http://www.isi.edu/~muslea/RISE/index.html. (RISE is a distributed repository of online information sources that are used for the empirical analysis of learning algorithms that generate extraction patterns. The sources included in this repository are provided by people from the information extraction (IE) and wrapper generation (WG) communities. Both communities use machine learning algorithms to generate extraction patterns for online information sources.)

To make the comparison between the two systems as fair as possible, no use was made of any domain specific wildcards, and diligent attempts were made to follow the exact experimental conditions used by Kushmerick. For all 21 sources for which WIEN had labeled examples, the exact same data was used; for the remaining 9 sources, close work was made with Kushmerick to reproduce the original WIEN extraction tasks. Furthermore, WIEN's experimental setup was also used: start is made with one randomly chosen training example, learn an extraction rule, and test it against all the unseen examples. These steps were repeated 30 times, and the number of test examples that are correctly extracted were averaged. The same procedure was repeated with 2, 3, . . . , and 10 training examples. As opposed to WIEN, no training was made on more than 10 examples because it was noticed that, in practice, a user rarely has the patience of labeling more than 10 training examples.

Provided herein is an overview of the performance of STALKER and WIEN over the 30 test domains, continuing with an analysis of STALKER's ability to learn list extraction and iteration rules, which are key components in our approach to hierarchical wrapper induction. Then, STALKER and WIEN are compared and contrasted based on the number of examples required to wrap the sources, and conclusion is made with the main lessons drawn from this empirical evaluation.

The data in Table I (FIG. 16) provides an overview of the two systems' performance over the 30 sources. The first four columns contain the source name, whether or not the source has missing items or items that may appear in various orders, and the number of embedded lists in the EC tree. The next two columns specify how well the two systems performed: whether they wrapped the source perfectly, imperfectly, or completely failed to wrap it. For purposes of explanation, the last two columns in the table are temporarily ignored.

In order to better understand the data from Table I, understanding must be obtained of the type of wrappers that WIEN generates (a more technical discussion is provided below). WIEN uses a fairly simple extraction language: it does not allow the use of wildcards and disjunctive rules, and the items in each k-tuple are assumed to be always present and to always appear in the same order. Based on the assumptions above, WIEN learns a unique multi-slot extraction rule that extracts all the items in a k-tuple at the same time (by contrast, STALKER generates several single-slot rules that extract each item independently of its siblings in the k-tuple). For instance, in order to extract all the addresses and area codes from the document in FIG. 3, a hypothetical WIEN rule does the following: it ignores all characters until it finds the string "<p> <i>" and extracts as Address everything until it encounters a "(". Then it immediately starts extracting the area code, which ends at ")". After extracting such a 2-tuple, the rule is applied again until it does not match anymore.

Out of the 30 sources, WIEN wraps perfectly 18 of them, and completely fails on the remaining 12. These complete failures have a straightforward explanation: if there is no perfect wrapper in WIEN's language (because, for example, there are some missing items), the inductive algorithm does not even try to generate an imperfect rule. It is important to note that WIEN fails to wrap all sources that include embedded lists (remember that embedded lists are at least two levels deep) or items that are missing or appear in various orders.

On the same test domains, STALKER wraps perfectly 20 sources and learns 8 additional imperfect wrappers. Out of these last 8 sources, in 4 cases STALKER generates "high quality" wrappers (i.e., wrappers in which most of the rules are 100% accurate, and no rule has an accuracy below 90%). Finally, two of the 30 sources, S21 and S29, can not be wrapped by STALKER. The documents in S21 are difficult to wrap because they include a heterogeneous list (i.e., the list contains elements of several types). As each type of element uses a different kind of layout, the iteration task is extremely difficult. The second source, S29, raises a different type of problem: some of the items have just a handful of occurrences in the collection of documents, and, furthermore, about half of them represent various types of formatting/semantic errors (e.g., the date appearing in the location of the price slot, and the actual date slot remaining empty). Under these circumstances, a decision was made to declare this source unwrappable by STALKER.

In order to wrap all 28 sources, STALKER induced 206 different rules, out of which 182 (i.e., more than 88%) had 100% accuracy, and another 18 were at least 90% accurate; in other words, only six rules, which represents 3% of the total, had an accuracy below 90%. Furthermore, as indicated in more detail below, the perfect rules were usually induced based on just a few training examples.

As opposed to WIEN, which performs an implicit list iteration by repeatedly applying the same multi-slot extraction rule, STALKER learns explicit list extraction and iteration rules that allow navigation within the EC tree. These types of rules are crucial to the approach of the present invention because they allow decomposition of a difficult wrapper-induction problem into several simpler ones in which we always extract one individual item from its parent. To estimate STALKER's performance, analysis of its performance is needed at learning the 32 list extraction and 32 list iteration rules that appear in the 28 test domains above.

The results are shown in the last two columns of Table I, where the number of training examples and the accuracy for each such rule is provided. Note that there are some sources, like S16, that have no lists at all. At the other end of the spectrum, there are several sources that include two lists. For sources with multiple lists, the data is presented in two different ways. If all the learned rules are perfect, the results appear on the same table line (e.g., for S7, the list extraction rules required 6 and 1 examples, respectively, while the list iteration rules required 2 and 7 examples, respectively). If at least one of the rules has an accuracy below 100%, the data for the different lists appear on successive lines (see, for instance, the source S9).

The results are extremely encouraging: only one list extraction and two list iteration rules were not learned with a 100% accuracy, and all these imperfect rules have accuracies above 90%. Furthermore, out of the 72 rules, 50 of them were learned based on a single training example. This is a remarkable result. As induction based on a single example is quite unusual in machine learning, it deserves a few comments. STALKER learns a perfect rule based on a single example whenever one of the initial candidates is a perfect disjunct. Such situations are frequent in our framework because the hierarchical decomposition of the problem makes most of the subproblems (i.e., the induction of the individual rules) straightforward. In final analysis, it can be said that independently of how difficult it is to induce all the extraction rules for a particular source, the list extraction and iteration rules can be usually learned with a 100% accuracy based on just a few examples.

In order to easily compare WIEN's and STALKER's requirements in terms of the number of training examples, the sources above were divided into three main groups:
sources that can be perfectly wrapped by both systems (Table II) (FIG. 17)
sources that can be wrapped perfectly only by one system (Tables III and IV) (FIGS. 18 and 19, respectively)
sources on which WIEN fails completely, while STALKER generates imperfect wrappers (Table V) (Table 20).

For each source that WIEN can wrap (see Tables II and IV), two pieces of information are provided: the number of training pages required by WIEN to generate a correct wrapper, and the total number of item occurrences that appear in those pages. The former is taken from the Kushmerick, 1997 reference and represents the smallest number of completely labeled training pages required by one of the six wrapper classes that can be generated by WIEN. The latter was obtained by multiplying the number above by the average number of item occurrences per page, computed over all available documents.

For each source that STALKER wrapped perfectly, four pieces of information are reported: the minimum, maximum, mean, and median number of training examples (i.e., item occurrences) that were required to generate a correct rule. The empirical data for the perfectly wrapped sources is presented in such a compact format because it is more readable than a huge table that provides detailed information for each individual rule. Furthermore, as 19 of the 20 sources from Tables II and III have a median number of training examples equal to one, it follows that more than half of the individual item data would read "item X required a single training example to generate a 100% accurate rule." For the remaining 8 sources from Tables IV and V, an individual description for each learned rule is provided by providing the reached accuracy and the required number of training examples.

As shown by analyzing the data from Table II, for the 16 sources that both systems can wrap correctly, STALKER requires up to two orders of magnitude fewer training examples. STALKER requires no more than 9 examples for any rule in these sources, and for more than half of the rules it can learn perfect rules based on a single example (similar observations can be made for the four sources from Table III).

As the main bottleneck in wrapper induction consists of labeling the training data, the advantage of STALKER becomes quite obvious.

Table IV reveals that despite its advantages, STALKER may learn imperfect wrappers for sources that pose no problems to WIEN. The explanation is quite simple and is related to the different ways in which the two systems define a training example: WIEN's examples are entire documents, while STALKER uses fragments of pages (each parent of an item is a fragment of a document). This means that for sources in which each document contains all possible variations of the main format, WIEN is guaranteed to see all possible variations. On the other hand, STALKER has practically no chance of having all these variations in each randomly chosen training set. Consequently, whenever STALKER is trained only on a few variations, it will generate an imperfect rule. In fact, the different types of training examples lead to an interesting trade-off: by using only fragments of documents, STALKER may learn perfect rules based on significantly fewer examples than WIEN. On the other hand, there is a risk that STALKER may induce imperfect rules; one plan to fix this problem is by using active learning techniques (RayChaudhuri and Hamey, 1997) to identify all possible types of variations.

Finally, Table V provides detailed data about the learned rules for the six most difficult sources. Besides the problem mentioned above, which leads to several rules of 99% accuracy, these sources also contain missing items and items that may appear in various orders. Out of the 62 rules learned by STALKER for these six sources, 42 are perfect and another 14 have accuracies above 90%. Sources like S6 and S9 emphasize another advantage of the STALKER approach: one can label just a few training examples for the rules that are easier to learn, and than focus on providing additional examples for the more difficult ones.

Based on the results above, several important conclusions may be drawn. First of all, compared with WIEN, STALKER has the ability to wrap a larger variety of sources. Even though not all the induced wrappers are perfect, an imperfect, high accuracy wrapper is to be preferred to no wrapper at all.

Second, STALKER is capable of learning most of the extraction rules based on just a couple of examples. This is a crucial feature because from the user's perspective it makes the wrapper induction process both fast and painless. Our hierarchical approach to wrapper induction played a key role at reducing the number of examples: on one hand, decomposition of a hard problem into several easier ones, which, in turn, require fewer examples. On the other hand, by extracting the items independently of each other, just a few examples require labelling for the items that are easy to extract (as opposed to labeling every single occurrence of each item in each training page).

Third, by using single-slot rules, the harder items are not allowed to affect the accuracy of the ones that are easier to extract. Consequently, even for the most difficult sources, STALKER is typically capable of learning perfect rules for several of the relevant items.

Fourth, the fact that even for the hardest items STALKER usually learns a correct rule (in most of the cases, the lower accuracies come from averaging correct rules with erroneous ones) means that attempts may be made to improve STALKER's behavior based on active learning techniques that would allow the algorithm to select the few relevant cases that would lead to a correct rule.

A significant contribution of the present invention is to turn a potentially hard problem (learning extraction rules) into a problem that is extremely easy in practice (i.e., typically very few examples are required). The number of required examples is small because the EC description of a page simplifies the problem tremendously: as the Web pages are intended to be human readable, the EC structure is generally reflected by actual landmarks on the page. STALKER merely has to find the landmarks, which are generally in the close proximity of the items to be extracted. In other words, the extraction rules are typically very small, and, consequently, they are easy to induce.

The present invention may be developed in several directions. First, plans to use unsupervised learning in order to narrow the landmark search-space are contemplated. Second, active learning techniques may prove fruitful to minimize the amount of labeling that the user has to perform.

Articles co-authored by the inventors are incorporated herein by this reference and include "A Hierarchical Approach to Wrapper Induction," "Wrapper Induction for Semistructured Web-based Information Sources," and "Hierarchical Wrapper Induction for Semistructured Information Sources."

While the present invention has been described with regards to particular embodiments, it is recognized that additional variations of the present invention may be devised without departing from the inventive concept.

What is claimed is:

1. A method for inducing or learning extraction rules for extracting data from a collection of data records, the steps comprising:

providing examples of the collection of data records to provide an example set;

indicating desired information in said example set;

providing a rule list, said rule list initially empty;

learning a rule based upon said example set and returning a new learned rule, said step of learning a new rule base upon said example including designating a seed example, creating rule candidates based upon said seed example to provide a candidate set, said rule candidates created by creating a two-state (2-state) landmark automaton for each seed token t that ends a prefix immediately preceding desired information, by creating a 2-state landmark automaton for each wildcard matching each of said seed tokens t, and by collecting all said 2-state landmark automations to provide said candidate set, refining said candidate set to provide a refined candidate set, and returning said refined candidate set;

adding said new learned rule to said rule list removing all examples covered by said new learned rule from said example set to provide a revised example set;

defining said example set as said revised example set;

repeating the steps of learning a new rule, adding said new learned rule, and removing all covered examples until said example set is empty; and returning said rule list; whereby said rule list provides a set of rules by which desired information may be identified for extraction from said collection of data records and other data records similar to said examples.

2. The method for inducing or learning extraction rules for extracting data from a collection of data records as set forth in claim 1, wherein the step of designating a seed example further comprises:

designating a shortest example in said example set having a fewest number of tokens.

3. The method for inducing or learning extraction rules for extracting data from a collection of data records as set forth in claim 1, wherein the step of refining said candidate set further comprises:

refining said candidate set to provide a new candidate set;

determining if a perfect solution has been achieved in said candidate set;

if necessary, repeating said refining and determining steps upon said new candidate set in place of said candidate set until a perfect solution has been achieved, if necessary; and returning said new candidate set.

4. The method for inducing or learning extraction rules for extracting data from a collection of data records as set forth in claim 3, wherein the step of refining said candidate set further comprises:

determining a best refined candidate rule from said candidate set;

creating a token-based rule for each token t in said seed example that precedes a landmark l of said best refined candidate rule present in said seed example, said token-based rule adding a landmark automata based on said token to said best refined candidate rule and collecting each of said token-based rules in a token rule set;

creating a wildcard-based rule for each rule in said token rule set by substituting all valid wildcards for each token t in said token-based rule by adding a landmark automata based on each of said wildcards to said best refined candidate rule and collecting each of said wildcard-based rules in a wildcard rule set;

eliminating duplicates in said token rule set and said wildcard rule set;

repeating said steps of creating said token rule set and said wildcard rule set for each landmark in said best refined candidate rule; and collecting all rules in a topology refinement rule set.

5. The method for inducing or learning extraction rules for extracting data from a collection of data records as set forth in claim 4, wherein the step of determining a best refined candidate rule further comprises:

selecting best refined candidates based on candidates selected from the group consisting of: candidates providing larger coverage, candidates providing more early matches, candidates providing more failed matches, candidates having fewer wildcards, candidates having shorter unconsumed prefixes, candidates having fewer tokens in SkipUntil( ) statements, candidates having longer end-landmarks.

6. The method for inducing or learning extraction rules for extracting data from a collection of data records as set forth in claim 3, wherein the step of refining said candidate set further comprises:

determining a best refined candidate rule from said candidate set;

providing a sequence of consecutive tokens present in said seed example;

matching a first landmark in said best refined candidate rule with said sequence to provide a match;

creating a pre-landmark token rule by adding a token in said sequence immediately preceding said match, said pre-landmark token rule being a landmark automata based on the combination of said preceding token and said first landmark;

creating a post-landmark token rule by adding a token in said sequence immediately following said match, said post-landmark token rule being a landmark automata based on a combination of said following token and said first landmark;

creating pre-landmark wildcard-based rules by substituting all valid wildcards for said preceding token in said pre-landmark token rule by adding a landmark automata based on a combination of each of said wildcards and said first landmark and collecting each of said pre-landmark wildcard-based rules in a pre-landmark wildcard rule set;

creating post-landmark wildcard-based rules by substituting all valid wildcards for said following token in said post-landmark token rule by adding a landmark automata based on a combination of each of said wildcards and said first landmark and collecting each of said post-landmark wildcard-based rules in a post-landmark wildcard rule set;

repeating said steps of creating said pre-landmark token rule, creating said post-landmark token rule set, creating said pre-landmark wildcard-based rule set, and creating said post-landmark wildcard rule set for each landmark in said best refined candidate rule matching a sequence of consecutive tokens present in said seed example; and collecting all rules so generated in a landmark refinement rule set.

7. The method for inducing or learning extraction rules for extracting data from a collection of data records as set forth in claim 3, wherein the step of determining if a perfect solution has been achieved further comprises:

determining a current best solution from a union of a prior best solution with said candidate set.

8. The method for inducing or learning extraction rules for extracting data from a collection of data records as set forth in claim 7, wherein the step of determining a current best solution further comprises:

selecting best solution candidates based on candidates selected from the group consisting of: candidates having more correct matches, candidates having more failures to match, candidates having fewer tokens in SkipUntil( ) statements, candidates having fewer wildcards, candidates having longer end-landmarks, and candidates having shorter unconsumed prefixes.

9. A method for inducing or learning extraction rules for extracting data from a collection of data records, the steps comprising:

providing examples of the collection of data records to provide an example set;

indicating desired information in said example set;

providing a rule list, said rule list initially empty;

learning a rule based upon said example set and returning a new learned rule by designating a seed example, said seed example being a shortest example in said example set having a fewest number of tokens, creating rule candidates based upon said seed example to provide a candidate set, by refining said candidate set to provide a refined candidate set, and by returning said refined candidate set;

said rule candidates created by creating a two-state (2-state) landmark automaton for each seed token t that ends a prefix immediately preceding desired information, by creating a 2-state landmark automaton for each wildcard matching each of said seed tokens t, and by collecting all said 2-state landmark automations to provide said candidate set;

said candidate set refined by refining said candidate set to provide a new candidate set, by determining if a perfect solution has been achieved in said new candidate set, by, if necessary, repeating said refining and determining steps upon said new candidate as said candidate set until a perfect solution has been achieved, and by returning a resulting candidate set as said refined candidate set;

said candidate set further refined by determining a best refined candidate rule from said candidate set, creating a token-based rule for each token t in said seed example that precedes a landmark l of said best refined candidate rule present in said seed example, said token-based rule adding a landmark automata based on said token to said best refined candidate rule and collecting each of said token-based rules in a token rule set, by creating a wildcard-based rule for each rule in said token rule set by substituting all valid wildcards for each token t in said token-based rule by adding a landmark automata based on each of said wildcards to said best refined candidate rule and collecting each of said wildcard-based rules in a wildcard rule set, by eliminating duplicates in said token rule set and said wildcard rule set, by repeating said steps of creating said token rule set and said wildcard rule set for each landmark in said best refined candidate rule, and by collecting all rules in a topology refinement rule set;

said step of determining a best refined candidate including selecting best refined candidates based on candidates selected from the group consisting of: candidates providing larger coverage, candidates providing more early matches, candidates providing more failed matches, candidates having fewer wildcards, candidates having shorter unconsumed prefixes, candidates having fewer tokens in SkipUntil( ) statements, candidates having longer end-landmarks;

said candidate set further refined by determining a best refined candidate rule from said candidate set, by providing a sequence of consecutive tokens present in said seed example, by matching a first landmark in said best refined candidate rule with said sequence to provide a match, by creating a pre-landmark token rule by adding a token in said sequence immediately preceding said match, said pre-landmark token rule being a landmark automata based on the combination of said preceding token and said first landmark, by creating a post-landmark token rule by adding a token in said sequence immediately following said match, said post-landmark token rule being a landmark automata based on a combination of said following token and said first landmark, by creating pre-landmark wildcard-based rules by substituting all valid wildcards for said preceding token in said pre-landmark token rule by adding a landmark automata based on a combination of each of said wildcards and said first landmark and collecting each of said pre-landmark wildcard-based rules in a pre-landmark wildcard rule set, by creating post-landmark wildcard-based rules by substituting all valid wildcards for said following token in said post-landmark token rule by adding a landmark automata based on a combination of each of said wildcards and said first landmark and collecting each of said post-landmark wildcard-based rules in a post-landmark wildcard rule set, by repeating said steps of creating said pre-landmark token rule, creating said post-landmark token rule set, creating said pre-landmark wildcard-based rule set, and creating said post-landmark wildcard rule set for each landmark in said best refined candidate rule matching a sequence of consecutive tokens present in said seed example, and by collecting all rules so generated in a landmark refinement rule set;

said step of determining if a perfect solution has been achieved including determining a current best solution from a union of a prior best solution with said candidate set and by selecting best solution candidates based on candidates selected from the group consisting of: candidates having more correct matches, candidates having more failures to match, candidates having fewer tokens in SkipUntil( ) statements, candidates having fewer wildcards, candidates having longer end-landmarks, and candidates having shorter unconsumed prefixes;

adding said new learned rule to said rule list;

removing all examples covered by said new learned rule from said example set to provide a revised example set;

defining said example set as said revised example set;

repeating the steps of learning a new rule, adding said new learned rule, and removing all covered examples until said example set is empty; and returning said rule list; whereby said rule list provides a set of rules by which desired information may be identified for extraction from said collection of data records and other data records similar to said examples.

10. A method for inducing or learning extraction rules for extracting data from a collection of data records, the steps comprising:

providing examples of the collection of data records to provide an on each of said wildcards to said best refined candidate rule and collecting each of said wildcard-based rules in a wildcard rule set, eliminating duplicates in said token rule set and said wildcard rule set, repeating said steps of creating said token rule set and said wildcard rule set for each landmark in said best refined candidate rule, and collecting all rules in a topology refinement rule set;

adding said new learned rule to said rule list;

removing all examples covered by said new learned rule from said example set to provide a revised example set;

defining said example set as said revised example set;

repeating the steps of learning a new rule, adding said new learned rule, and removing all covered examples until said example set is empty; and returning said rule list; whereby said rule list provides a set of rules by which desired information may be identified for extraction from said collection of data records and other data records similar to said examples.

11. The method for inducing or learning extraction rules for extracting data from a collection of data records as set forth in claim 10, wherein the step of determining a best refined candidate rule further comprises:

selecting best refined candidates based on candidates selected from the group consisting of: candidates providing larger coverage, candidates providing more early matches, candidates providing more failed matches, candidates having fewer wildcards, candidates having shorter unconsumed prefixes, candidates having fewer tokens in SkipUntil( ) statements, candidates having longer end-landmarks.

12. A method for inducing or learning extraction rules for extracting data from a collection of data records, the steps comprising:

providing examples of the collection of data records to provide an example set;

indicating desired information in said example set;

providing a rule list, said rule list initially empty;

learning a rule based upon said example set and returning a new learned rule;

said step of learning a new rule including designating a seed example, creating rule candidates based upon said seed example to provide a candidate set, refining said candidate set to provide a refined candidate set, and returning said refined candidate set;

said step of refining said candidate set including refining said candidate set to provide a new candidate set, determining if a perfect solution has been achieved in said candidate set, if necessary, repeating said refining and determining steps upon said new candidate set in place of said candidate set until a perfect solution has been achieved, if necessary, and returning said new candidate set;

said step of refining said candidate set also including determining a best refined candidate rule from said candidate set, providing a sequence of removing all examples covered by said new learned rule from said example set to provide a revised example set;

defining said example set as said revised example set;

repeating the steps of learning a new rule, adding said new learned rule, and removing all covered examples until said example set is empty; and returning said rule list; whereby said rule list provides a set of rules by which desired information may be identified for extraction from said collection of data records and other data records similar to said examples.

13. A method for inducing or learning extraction rules for extracting data from a collection of data records, the steps comprising:

providing examples of the collection of data records to provide an example set;

indicating desired information in said example set;

providing a rule list, said rule list initially empty;

learning a rule based upon said example set and returning a new learned rule;

said step of learning a new rule including designating a seed example, creating rule candidates based upon said seed example to provide a candidate set, refining said candidate set to provide a refined candidate set, and returning said refined candidate set;

said step of refining said candidate set including refining said candidate set to provide a new candidate set, determining if a perfect solution has been achieved in said candidate set, if necessary, repeating said refining and determining steps upon said new candidate set in place of said candidate set until a perfect solution has been achieved, if necessary, and returning said new candidate set;

said step of determining if a perfect solution has been achieved including determining a current best solution from a union of a prior best solution with said candidate set;

said step of determining a current best solution including selecting best solution candidates based on candidates selected from the group consisting of: candidates having more correct matches, candidates having more failures to match, candidates having fewer tokens in SkipUntil( ) statements, candidates having fewer wildcards, candidates having longer end-landmarks, and candidates having shorter unconsumed prefixes;

adding said new learned rule to said rule list removing all examples covered by said new learned rule from said example set to provide a revised example set;

defining said example set as said revised example set;

repeating the steps of learning a new rule, adding said new learned rule, and removing all covered examples until said example set is empty; and returning said rule list; whereby said rule list provides a set of rules by which desired information may be identified for extraction from said collection of data records and other data records similar to said examples.

* * * * *